US009152303B2

(12) United States Patent
Yates et al.

(10) Patent No.: US 9,152,303 B2
(45) Date of Patent: Oct. 6, 2015

(54) SYSTEMS AND METHODS FOR EFFICIENT VIDEO ANALYSIS

(75) Inventors: J. Harlan Yates, Melbourne, FL (US); Timothy B. Faulkner, Palm Bay, FL (US); Mark Rahmes, Melbourne, FL (US); Tariq Bakir, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/409,660

(22) Filed: Mar. 1, 2012

(65) Prior Publication Data

US 2013/0232419 A1 Sep. 5, 2013

(51) Int. Cl.
| G06F 3/01 | (2006.01) |
| G06K 9/36 | (2006.01) |
| G06F 3/048 | (2013.01) |
| H04N 7/18 | (2006.01) |
| G06F 3/0484 | (2013.01) |

(52) U.S. Cl.
CPC .... *G06F 3/0484* (2013.01); *G06F 2203/04803* (2013.01); *G06F 2203/04806* (2013.01)

(58) Field of Classification Search
CPC .................. H04N 21/44008; H04N 19/00266; H04N 7/181; G06F 17/30843; G06F 17/30852; G06F 17/30781; G06F 17/3079; G06K 9/00711; G06K 9/00973; G06K 9/00751; G06K 9/00771
USPC ...................... 715/723, 719, 721; 725/37, 41; 386/241, 278
See application file for complete search history.

(56) References Cited

U.S. PATENT DOCUMENTS

| 4,135,147 | A | 1/1979 | Riganati et al. |
| 6,654,690 | B2 | 11/2003 | Rahmes et al. |
| 7,107,179 | B2 | 9/2006 | Malchi et al. |
| 7,376,513 | B2 | 5/2008 | Rahmes et al. |
| 7,391,899 | B2 | 6/2008 | Rahmes et al. |
| 7,702,016 | B2 | 4/2010 | Winder et al. |
| 7,732,768 | B1 | 6/2010 | Haigh et al. |
| 7,804,982 | B2 | 9/2010 | Howard et al. |
| 7,912,255 | B2 | 3/2011 | Rahmes et al. |
| 8,275,175 | B2 | 9/2012 | Baltatu et al. |
| 8,390,684 | B2 | 3/2013 | Piran et al. |
| 8,655,107 | B2 | 2/2014 | Okamoto |
| 2003/0098869 | A1* | 5/2003 | Arnold et al. ................. 345/589 |
| 2003/0103659 | A1 | 6/2003 | Hara et al. |

(Continued)

OTHER PUBLICATIONS (Authors Unknown), Simple random sample, Wikipedia entry, as archived on Dec. 14, 2010, 18 pages as retrieved from http://en.wikipedia.org/w/index.php?title_Simple_random_sample &oldid=402414410 on Apr. 19, 2015, 3 pages.

(Continued)

*Primary Examiner* — Amy Ng
*Assistant Examiner* — Sang H Kim
(74) *Attorney, Agent, or Firm* — Robert J. Sacco, Esq.; Fox Rothschild LLP

(57) ABSTRACT

Systems (100) and methods (300) for efficient video analysis. The methods involve: automatically identifying features of at least one feature class which are contained in a first video stream; simultaneously generating a plurality of first video chips (904) using first video data defining the first video stream; displaying an array comprising the first video chips within a graphical user interface window; and concurrently playing the first video chips. Each of the first video chips comprises a segment of the first video stream which includes at least one identified feature.

34 Claims, 24 Drawing Sheets

(56) References Cited

U.S. PATENT DOCUMENTS

| | | | |
|---|---|---|---|
| 2003/0156824 A1* | 8/2003 | Lu | 386/68 |
| 2004/0218099 A1* | 11/2004 | Washington | 348/571 |
| 2006/0110128 A1* | 5/2006 | Dunton et al. | 386/52 |
| 2006/0120624 A1* | 6/2006 | Jojic et al. | 382/284 |
| 2006/0259856 A1* | 11/2006 | Atkins | 715/517 |
| 2008/0279416 A1 | 11/2008 | Lo et al. | |
| 2008/0319723 A1 | 12/2008 | Smith et al. | |
| 2009/0027417 A1 | 1/2009 | Horsfall et al. | |
| 2009/0109298 A1* | 4/2009 | Wan | 348/222.1 |
| 2009/0219154 A1 | 9/2009 | Kukula et al. | |
| 2010/0100835 A1 | 4/2010 | Klaric et al. | |
| 2010/0135540 A1 | 6/2010 | Cervantes | |
| 2010/0172590 A1 | 7/2010 | Foehr et al. | |
| 2010/0232659 A1 | 9/2010 | Rahmes et al. | |
| 2010/0239165 A1 | 9/2010 | Wu et al. | |
| 2011/0044513 A1 | 2/2011 | McGonagle et al. | |
| 2011/0044514 A1 | 2/2011 | Rahmes et al. | |
| 2011/0262013 A1 | 10/2011 | Rahmes et al. | |
| 2012/0017152 A1* | 1/2012 | Matsuda et al. | 715/723 |
| 2012/0272185 A1* | 10/2012 | Dodson et al. | 715/810 |
| 2013/0044219 A1* | 2/2013 | Burry et al. | 348/149 |
| 2013/0088600 A1* | 4/2013 | Wu et al. | 348/149 |
| 2013/0120454 A1* | 5/2013 | Shechtman et al. | 345/635 |

OTHER PUBLICATIONS

Neteler and Mitasova, "Open Source GIS: GIS Approach" 2008, Third Ed. The International Series in Engineering and Computer Science, Springer, New York, vol. 773, 417 pages, 80 illus.

Lewis, P., et al., "Spatial Video and GIS", International Journal of Geographical Information Science, vol. 25, No. 5, May 2011, 697-716.

Zhu, Z., "Geo-Mosaic for Environmental Monitoring", CUNY City College Visual Computing Laboratory, http:/www-cs.ccny.cuny.edu/~zhu/geomosaic.html.

Schultz, H., et al., "A System for Real-Time Generation of Georeferenced Terrain Models", Proceedings SPIE Symposium on Enabling Technologies for Law Enforcement, 2000. http:/citeseerx.ist.psu.edu/viewdoc/summary?doi=10.1.1.121.6475.

Oksanen, J., "Tracing the Gross Errorsof Dem. Visualization Techniques for Preliminary Quality Analysis", Proceedings of the 21st International Cartographic Conference (ICC), Durban, South Africa, Aug. 10-16, 2003.

Timmons, , G., "Weed Mapping Hi-TEch Breakthrough for Invasive Plants", [online] Retrieved on Dec. 10, 2013. Retrieved from: http://www.nature.org/ourinitiatives/regions/northamerica/unitedstates/hawaii/explore/hi-tech-breakthrough-for-invasive-plants.xml.

Reiners, W., et al., "Statistical Evaluation of the Wymoning and Colorado Landcover Map Thermatic Accuracy Using Aerial Videography Techniques", May 2000, [online]. Retrieved from: https://ndis1.nrel.colostate.edu/cogap/reprot/colandcov_acc. pdf.

Souris, M., "Aerial Videography; Principles and Guidelines of Implementation"; Aerial Videography—UNHRC-IRD (ex-Orstom), 1999, pp. 1-54.

Slaymaker, D., "Using Georeferenced Large-Scale Aerial Videography as a Surrogate for Gound Validation Data", [online] Retrieved on Dec. 10, 2013; from: http://link.springer.com/chapter/10.1007%2F978-1-4615-0306-4_18#.

Slaymaker, D., "Progress on the CAO Hyperpectral / LIDAR Imagery Project" [online] Retrived on Dec. 10, 2013; http://www.slideshare.net/higicc/progress-on-the-cao-hyperspectral-lidar-imagery-project.

Information about Related Patents and Patent Applications, see section 6 of the accompanying Information Disclosure Statement Letter, which concerns Related Patents and Patent Applications. Dec. 11, 2013.

* cited by examiner

SYSTEMS AND METHODS FOR EFFICIENT VIDEO ANALYSIS

BACKGROUND OF THE INVENTION

1. Statement of the Technical Field

The invention concerns computing systems. More particularly, the invention concerns computing systems and methods for efficient video analysis.

2. Description of the Related Art

The large amount of video surveillance data collected and maintained today requires increasingly efficient methods for analysis. There are many challenges to the analysis of video which are imposed by it's usage as a forensic tool across military applications, law enforcement applications and commercial applications. For example, video analysis is used in unmanned mission applications, critical transportation surveillance applications, energy infrastructure surveillance applications, online geospatial video portal applications, medical applications and industrial production applications. These applications share a common need for efficient analysis of video data which may or may not exist within a geospatial context.

Some traditional approaches for video analysis involve manual video play-back and/or frame-by-frame analysis. One can readily appreciate that techniques employing manual video play-back and frame-by-frame analysis are ad-hoc, time consuming and expensive. Other traditional approaches for video analysis involve comparing the content of two or more video streams. This comparison is achieved by toggling between different video streams or by viewing different video streams that are presented in a side by side manner. Such comparison techniques are time consuming and subject to human error as a result of operator fatigue.

SUMMARY OF THE INVENTION

Embodiments of the present invention concern implementing systems and methods for efficient video analysis. The methods generally involve: automatically identifying features of at least one feature class or visual representations of at least one object which are contained in a first video stream; simultaneously generating a plurality of first video chips using first video data defining the first video stream; displaying an array comprising the first video chips within a Graphical User Interface ("GUI") window; and concurrently playing the first video chips. The phrases "playing a video chip", as used herein, means the reproduction of a segment of a video recording after it has been made by sequentially displaying images in an image sequence. Each of the first video chips comprises a segment of the first video stream which includes at least one identified feature.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
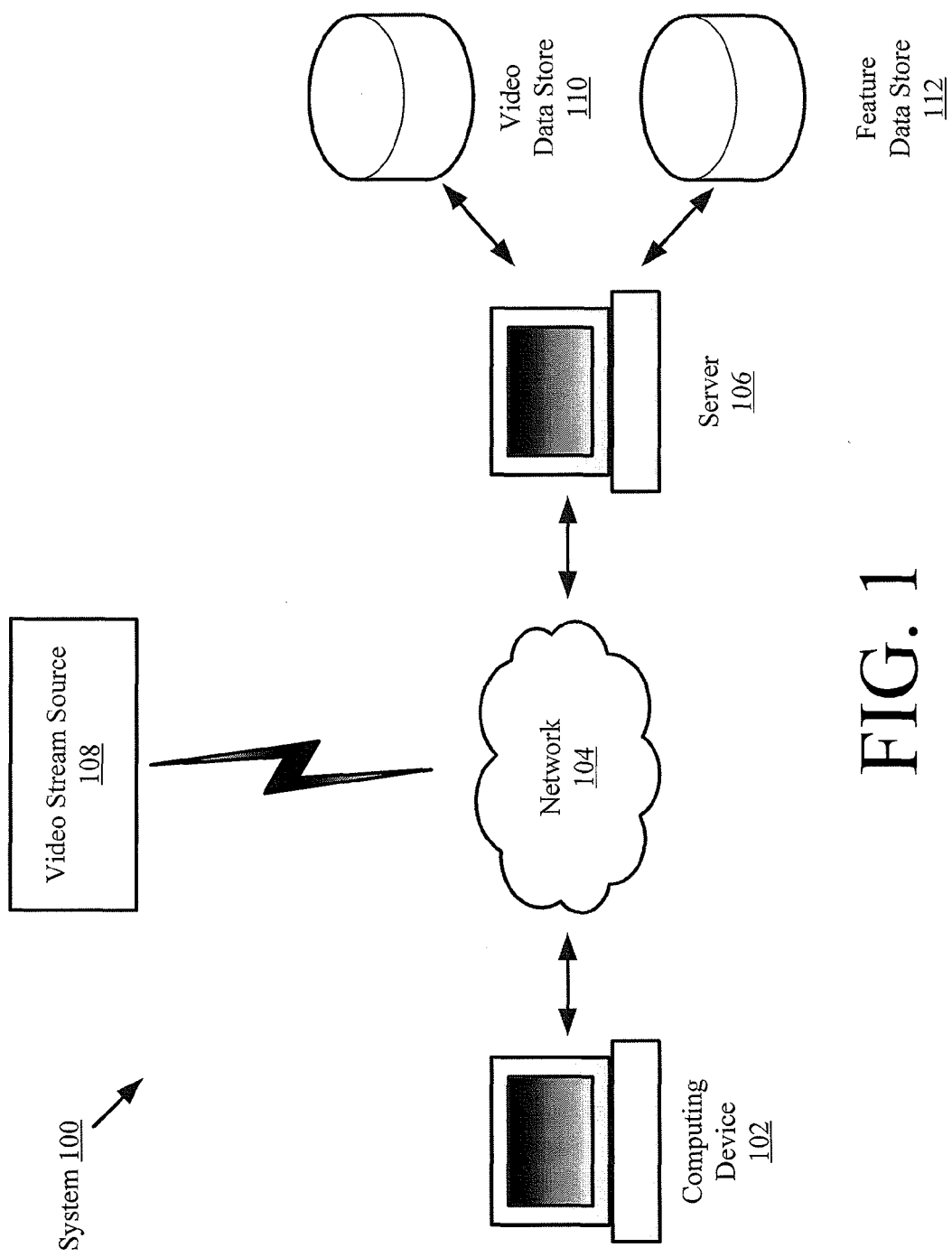
FIG. 1 is a schematic illustration of an exemplary system that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

The present invention concerns implementing systems and methods for efficient video analysis. In this regard, the present invention implements a novel technique for simultaneously or concurrently visually inspecting numerous segments of a video stream. The particularities of the novel technique will become more evident as the discussion progresses. Still, it should be understood that the present invention overcomes various drawbacks of conventional video analysis techniques, such as those described above in the background section of this document. For example, the present invention provides more efficient, less time consuming and less costly video analysis processes as compared to those of conventional video analysis techniques. In this regard, it should be understood that the present invention allows an analyst to rapidly review video-based-features at differing temporal resolutions by viewing a video chip grid in a plug-in window. The phrase "temporal resolution", as used herein, refers to a numerical value representing a total duration of a video stream and/or a numerical value representing a total number of images contained in an image sequence defining a video stream. In this way, the present invention provides an alternative to fast reversing and fast forwarding through an entire video stream or stepping through a video stream frame-by-frame to isolate instances of feature occurrence. Also, the present invention allows fine-scale visualization of a time-of-interest within a video stream with minimal user-software interaction.

The present invention can be used in a variety of applications. Such applications include, but are not limited to, imagery applications, sensor applications, mapping applications, situational awareness applications, natural disaster analysis applications, unmanned vehicle applications, video applications, forensic applications, law enforcement applications, geospatial information based applications, medical applications, military applications, and any other application in which video data needs to be analyzed. Exemplary implementing system embodiments of the present invention will be described below in relation to FIGS. 1-2, 5, 7, 8A and 8B. Exemplary method embodiments of the present invention will be described below in relation to FIGS. 3A-30.

Exemplary Systems Implementing the Present Invention

Referring now to FIG. 1, there is provided a block diagram of an exemplary system 100 that is useful for understanding the present invention. The system 100 comprises a computing device 102, a network 104, a server 106, a video stream source 108, and at least one data store 110, 112. The system 100 may include more, less or different components than those illustrated in FIG. 1. However, the components shown are sufficient to disclose an illustrative embodiment implementing the present invention.

The hardware architecture of FIG. 1 represents one embodiment of a representative system configured to facilitate feature data maintenance using video stream source for feature display, quality control, and change detection. As such, system 100 implements a method for efficient spatial feature data analysis in accordance with embodiments of the present invention. The method will be described in detail below in relation to FIGS. 3A-30. However, it should be understood that the method implements a data driven approach for enabling an efficient evaluation of geospatial data using video data. The phrase "video data", as used herein, refers to data defining a video stream.

The geospatial data and video data can be stored in the same or different data stores. For example, as shown in FIG. 1, the geospatial data is stored in a feature data store 112 and the video data is stored in a video data store 110. The video data is collected by the video stream source 108. The video stream source 108 comprises an object comprising a video camera. Such objects include, but are not limited to, a satellite, an Unmanned Aerial Vehicle ("UAV"), a plane, a vehicle, a building, a tree or a post. Also, the video data can be communicated to the data store 110 via network 104 and server 106.

The computing device 102 facilitates video data analysis. Accordingly, the computing device 102 has installed thereon a Video Analysis ("VA") software application and at least one feature analysis plug-in. The VA software application includes, but is not limited to, a Kinovea software application, a MOTIONPRO® software application, a DARTFISH® software application, a Sports Computer Aided Design ("CAD") software application, or a Full-motion video Asset Management Engine ("FAME™") software application. Each of the listed VA software applications is well known in the art, and therefore will not be described in detail herein. However, it should be understood that the VA software applications facilitate the display of video streams in an application window. The VA software applications also facilitate the fast forwarding and fast reversing of the displayed video streams.

The feature analysis plug-in is a set of software components that adds specific abilities to the VA software application. For example, the feature analysis plug-in provides the ability to: concurrently and/or simultaneously generate a plurality of video chips using video data defining a video stream; and display all or a portion of the generated video chips in a display area of a plug-in window at the same time. The phrase "video chip", as used herein, refers to a spatial-temporal segment of video in which at least one feature of a feature class has been identified. The phrase "spatial-temporal segment of video", as used herein, refers to a segment of a video stream which has timing information (e.g., timestamps indicating when images of the segment were captured) and spatial information associated therewith. The timing information includes, but is not limited to, timestamps indicating when images of a video stream are captured. The spatial information includes, but is not limited to, information indicating locations on the Earth which are visually represented by content of images of a video stream (e.g., Global Positioning System information). The feature of the video chip can be used as a "finger print" for purposes of matching, feature change detection, causality identification, feature maintenance and performing other tasks. The feature changes can include, but are not limited to, the addition/destruction of a road, the addition/destruction of a railroad, the addition/destruction of a transmission line, the addition/destruction of a pipeline, and the expansion/destruction of a building. The destruction of a feature can result from a natural disaster, a public disorder, a military operation, a demolition or other cause.

A video chip may include one or more features of interest. The term "feature", as used herein, refers to a visual representation of an object. Such objects include, but are not limited to, bridges, water towers, boats, planes, roads, lakes, buildings, gas stations, restaurants, malls, stores, vehicles, people, and cisterns. Notably, the video chips may be displayed in the plug-in window in a grid format or a matrix format. In the grid scenario, each cell of a grid includes one video chip. As a result of such a grid arrangement of video chips, a user can perform feature analysis in a shorter period of time as compared to that needed to perform a feature analysis using the conventional technique employed by the VA software application. This conventional technique generally involves manually fast forwarding and/or fast reversing to each instance of a feature class.

Figure 2:
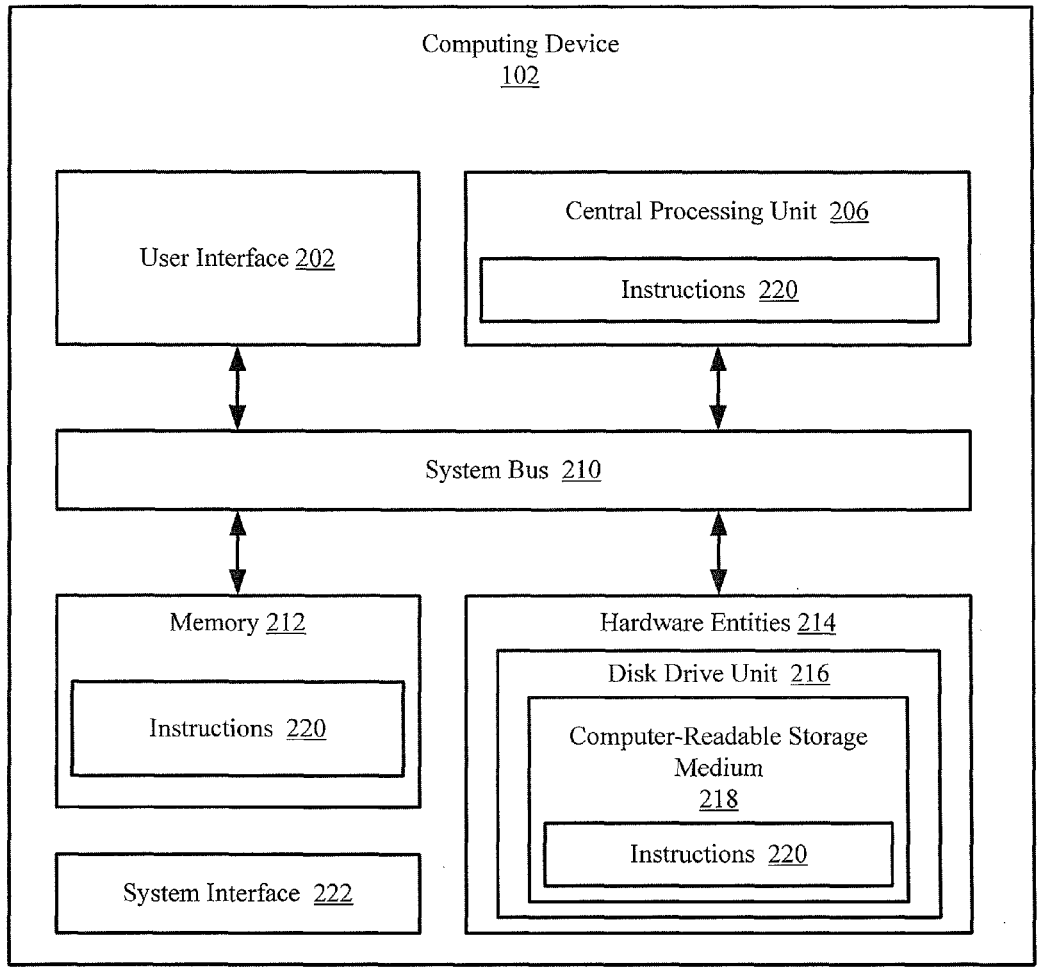
FIG. 2 is a block diagram of an exemplary computing device that is useful for understanding the present invention.

Referring now to FIG. 2, there is provided a block diagram of an exemplary embodiment of the computing device 102. The computing device 102 can include, but is not limited to, a notebook, a desktop computer, a laptop computer, a personal digital assistant, and a tablet PC. The server 106 of FIG. 1 can be the same as or similar to computing device 102. As such, the following discussion of computing device 102 is sufficient for understanding server 106 of FIG. 1. Notably, some or all the components of the computing device 102 can be implemented as hardware, software and/or a combination of hardware and software. The hardware includes, but is not limited to, one or more electronic circuits.

Notably, the computing device 102 may include more or less components than those shown in FIG. 2. However, the components shown are sufficient to disclose an illustrative embodiment implementing the present invention. The hardware architecture of FIG. 2 represents one embodiment of a representative computing device configured to facilitate feature data analysis in an efficient manner. As such, the computing device 102 of FIG. 2 implements improved methods for feature data analysis in accordance with embodiments of the present invention.

As shown in FIG. 2, the computing device 102 includes a system interface 222, a user interface 202, a Central Processing Unit ("CPU") 206, a system bus 210, a memory 212 connected to and accessible by other portions of computing device 102 through system bus 210, and hardware entities 214 connected to system bus 210. At least some of the hardware entities 214 perform actions involving access to and use of memory 212, which can be a Random Access Memory ("RAM"), a disk driver and/or a Compact Disc Read Only Memory ("CD-ROM").

System interface 222 allows the computing device 102 to communicate directly or indirectly with external communication devices (e.g., server 106 of FIG. 1). If the computing device 102 is communicating indirectly with the external communication device, then the computing device 102 is sending and receiving communications through a common network (e.g., the network 104 shown in FIG. 1).

Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 102. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 102 and that cause the computing device 102 to perform any one or more of the methodologies of the present disclosure.

In some embodiments of the present invention, the hardware entities 214 include an electronic circuit (e.g., a processor) programmed for facilitating efficient feature data analysis. In this regard, it should be understood that the electronic circuit can access and run VA software applications (not shown in FIG. 2), feature analysis plug-ins (not shown in FIG. 2) and other types of applications installed on the computing device 102. The VA software applications are generally operative to facilitate the display of video streams in an application window, the fast forwarding of displayed video streams, and the fast reversing of displayed video streams. The listed functions and other functions implemented by the VA software applications are well known in the art, and therefore will not be described in detail herein. A schematic illustration of an exemplary application window 504 is provided in FIG. 5.

The feature analysis plug-ins are generally operative to display a plug-in window on a display screen of the computing device 102. A schematic illustration of an exemplary plug-in window 702 is provided in FIG. 7. Various types of information can be presented in the plug-in window. Such information includes, but is not limited to, video chips and feature attributes. The feature attributes can include, but are not limited to, attributes of an object which a feature visually represents (e.g., heights, lengths, diameters, longitudes, latitudes, addresses, names, text and sales volumes).

The feature analysis plug-ins are also operative to perform one or more of: automatically and simultaneously generate a plurality of video chips in response to a user-software interaction; generate at least one page of video chips arranged in a grid or matrix format; display pages of video chips in a plug-in window; simultaneously or concurrently play a plurality of video chips of a displayed page of video chips; aggregate two or more video chips in response to a user-software interaction; generate at least one page of aggregated video chips arranged in a grid or matrix format; display pages of aggregated video chips in a plug-in window; simultaneously or concurrently play a plurality of video chips of a displayed page of aggregated video chips; display at least one attribute of a selected video chip image in a plug-in window; automatically fast forward and/or fast reverse a video stream displayed in an application window until the segment of the video stream comprising the selected video chip is displayed in an application window; sort a plurality of video chips based on at least one feature attribute; generate and display at least one page of video chips which are arranged in a sorted order; simultaneously or concurrently playing video chips of a page of sorted video chips; filter video chips based on at least one feature attribute; randomly select and display only a percentage of a plurality of video chips; change a grid size in response to a user-software interaction; change a temporal level of resolution of displayed video chips in response to a user-software interaction; change a spatial zoom level of resolution of displayed video chips in response to a user-software interaction; cycle through pages of video chips that were generated using a plurality of video streams; mark video chips in response to user software-interactions; unmark video chips in response to user-software interactions; and remember various settings that a user sets for each feature class (e.g., bridges, water towers and gas stations) during at least one session. The listed functions and other functions of the feature analysis plug-ins will become more apparent as the discussion progresses. Notably, one or more of the functions of the feature analysis plug-ins can be accessed via a toolbar, menus and other GUI elements of the plug-in window.

A schematic illustration of an exemplary toolbar 704 of a plug-in window (e.g., plug-in window 702 of FIG. 7) is provided in FIG. 8A. As shown in FIG. 8A, the toolbar 704 comprises a plurality of exemplary GUI widgets 802-830. Each of the GUI widgets 802-830 is shown in FIG. 8A as a particular type of GUI widget. For example, GUI widget 802 is shown as a drop down menu. Embodiments of the present invention are not limited in this regard. The GUI widgets 802-830 can be of any type selected in accordance with a particular application.

GUI widget 802 is provided to facilitate the display of an array of video chips including features of a user selected feature class (e.g., chimney/smokestack, gas station, restaurant, lake, road, water tower, and building). The array of video chips is displayed in the display area (e.g., display area 706 of FIG. 7) of the plug-in window (e.g., plug-in window 702 of FIG. 7) in a grid format. In the embodiment shown in FIG. 8A, the GUI widget 802 includes, but is not limited to, a drop down list that is populated with the feature classes identified in a previously generated feature list. Drop down lists are well known in the art, and therefore will not be described herein.

GUI widget 804 is provided to facilitate moving through pages of video chips associated with a single feature class. If a selected feature class has more than the maximum number of features that can fit in a grid of the a selected grid size (e.g., three cells by three cells), then the feature analysis plug-in generates a plurality of pages of video chips. Each page of video chips includes a grid with video chips contained in the cells thereof. As shown in the embodiment of FIG. 8A, the GUI widget 804 includes, but is not limited to, a text box, a forward arrow button and a backward arrow button. Text boxes and arrow buttons are well known in the art, and therefore will not be described herein. This configuration of the GUI widget 804 allows a user to move forward and backward through the pages of video chips associated with a single video stream. Paging forward or backward will cause the video chip in an upper left corner grid cell of the new page to be selected. The page context is displayed in the text box as the numerical range of video chips displayed (e.g., video chips one through nine) and the total number of video chips (e.g., twenty) providing visual representations of features of a selected feature class.

GUI widget 806 is provided to facilitate jumping to a desired page of video chips for review. As shown in the embodiment of FIG. 8A, GUI widget 806 includes, but is not limited to, a text box and a search button. The text box is a box in which to enter a page number (e.g., three). Clicking the search button will cause the page of video chips having the entered page number to be displayed in the display area (e.g., display area 706 of FIG. 7) of the plug-in window (e.g., plug-in window 702 of FIG. 7).

GUI widget 808 is provided to facilitate a selection of a grid size from a plurality of pre-defined grid sizes. As shown in FIG. 8A, the GUI widget 808 includes, but is not limited to, a drop down list listing a plurality of pre-defined grid sizes. In some embodiments, the pre-defined grid sizes include one cell by one cell, two cells by two cells, three cells by three cells, four cells by four cells, five cells by five cells, six cells by six cells, seven cells by seven cells, eight cells by eight cells, nine cells by nine cells, and ten cells by ten cells. The grid size of two cells by two cells ensures that a maximum of four video chips will be simultaneously or concurrently displayed in the display area of the plug-in window. The grid size of three cells by three cells ensures that a maximum of nine video chips will be simultaneously or concurrently displayed in the display area of the plug-in window. The grid size of four cells by four cells ensures that a maximum of sixteen video chips will be simultaneously or concurrently displayed in the display area of the plug-in window. The grid size of five cells by five cells ensures that a maximum of twenty-five video chips will be simultaneously or concurrently displayed in the display area of the plug-in window. The grid size of six cells by six cells ensures that a maximum of thirty-six video chips will be simultaneously or concurrently displayed in the display area of the plug-in window. The grid size of seven cells by seven cells ensures that a maximum of forty-nine video chips will be simultaneously or concurrently displayed in the display area of the plug-in window. The grid size of eight cells by eight cells ensures that a maximum of sixty-four video chips will be simultaneously or concurrently displayed in the display area of the plug-in window. The grid size of nine cells by nine cells ensures that a maximum of eight-one video chips will be simultaneously or concurrently displayed in the display area of the plug-in window. The grid size of ten cells by ten cells ensures that a maximum of one hundred video chips will be simultaneously or concurrently displayed in the display area of the plug-in window. Embodiments of the present invention are not limited to grid having an equal number of cells in the rows and columns thereof. For example, a grid can alternatively have a grid size of four cells by three cells such that each column thereof comprises four cells and each row thereof comprises three cells, or vice versa.

Notably, the display area for each video chip is different for each grid size. For example, the display area for each video chip in a grid having a grid size of two cells by two cells is larger than the display area for each video chip in a grid having a grid size of three cells by three cells. Also, if each video chip has the same spatial zoom level of scale or resolution, then the portion of a video stream contained in a video chip displayed in a two cell by two cell grid is larger than the portion of a video stream contained in a video chip displayed in a three cell by three cell grid. It should also be noted that, in some embodiments, a selected video chip of a first grid will reside in an upper left corner cell of a second grid having an enlarged or reduced grid size.

GUI widget 812 is provided to facilitate a selection of features for display in the display area (e.g., display area 706 of FIG. 7) of the plug-in window (e.g., plug-in window 702 of FIG. 7) based on their attributes. As shown in FIG. 8A, the GUI widget 812 includes a "filter control" button and a "filter setting" drop down button. The "filter control" button facilitates the enablement and disablement of an attribute filter function of the feature analysis plug-in. The "filter setting" drop down button facilitates the display of a drop-down box for assembling a query phrase defining an attribute filter (e.g., ["HEIGHT"='100 Feet'], ["HEIGHT"<'100 Feet'], ["HEIGHT"< >'100 Feet'], ["HEIGHT" IS NULL], ["HEIGHT" IS NOT NULL], ["HEIGHT"≥'100 Feet' AND "DIAMETER">'40 Feet'], or ["HEIGHT"≤'100 Feet' OR "DIAMETER">'40 Feet']). A schematic illustration of an exemplary drop-down box 850 is provided in FIG. 8B. When the attribute filter function is enabled, the query phrase takes effect immediately.

Notably, the feature analysis plug-in remembers the filter query phrase that a user sets for each feature class during a session. Accordingly, if the user changes a feature class from a first feature class (e.g., bridges) to a second feature class (e.g., water towers) during a session, then the previously set filter query for the second feature class will be restored. Consequently, only features of the second feature class (e.g., water towers) which have the attribute specified in the previously set filter query (e.g., "HEIGHT"='100 Feet') will be displayed in the plug-in window.

GUI widget 814 is provided to facilitate the sorting of video chips based on one or more attributes of the features contained therein. For example, a plurality of video chips are sorted into an ascending or descending order based on the heights and/or diameters of the water towers visually represented by the features contained therein. As shown in FIG. 8A, the GUI widget 814 includes a drop down list. Embodiments of the present invention are not limited in this regard. For example, the GUI widget 814 can alternatively include a button and a drop down arrow for accessing a drop down box. The button facilitates the enablement and disablement of a sorting function of the feature analysis plug-in. The drop down box allows a user to define settings for sorting video chips based on one or more attributes of an active feature class. As such, the drop down box may include a list from which an attribute can be selected from a plurality of attributes. The drop down box may also include widgets for specifying whether the video chips should be sorted in an ascending order or a descending order.

Notably, the feature analysis plug-in remembers the sort settings that a user defines for each feature class during a session. Accordingly, if the user changes a feature class from a first feature class (e.g., bridges) to a second feature class (e.g., water towers) during a session, then the previously defined sort settings for the second feature class will be restored. Consequently, video chips containing features of the second feature class (e.g., water towers) will be displayed in a sorted order in accordance with the previously defined sort settings.

GUI widget 820 is provided to facilitate the display of a random sample of video chips of features of a particular feature class for visual inspection and quality control testing. As such, the GUI widget 820 includes, but is not limited to, a button for enabling/disabling a random sampling function of the feature analysis plug-in and a drop down menu from which a percentage value can be selected.

GUI widget 822 is provided to facilitate the aggregation of at least one set of video chips to obtain at least one combined video chip with a longer duration than each of its component parts (i.e., the video chips of the set of video chips). For example, a first video chip is combined with an immediately following second video chip so as to form a combined video chip. In this scenario, each of the first and second video chips has a duration of five minutes. Consequently, the combined video chip has a duration of ten minutes. Embodiments of the present invention are not limited in this regard. As shown in FIG. 8A, the GUI widget 822 includes, but is not limited to, a button for enabling and disabling an aggregation function of the feature analysis plug-in. The GUI widget 822 may also comprise a means (not shown) for defining how many video chips should be combined to form each combined video chip (e.g., a text box and a drop down list).

GUI widget 810 is provided to facilitate the selection of a video stream from a plurality of video streams. As shown in FIG. 8A, the GUI widget 810 includes, but is not limited to, a text box and a drop down list populated with the names of video streams. If a user selects a new item from the drop down list, then the feature analysis plug-in generates and displays at least one page of video chips using the video stream indentified by the newly selected item. The video chips contain features of the same feature class as the immediately preceding displayed video chips. The text box displays information identifying the video stream from which the currently displayed video chips were generated. The contents of the text box can be updated in response to a user selection of a new item from the drop down list. The contents of the text box can also be updated by the feature analysis plug-in during the performance of video stream cycling operations, which will be described below in relation to GUI widget 824. Accordingly, the information contained in the text box always identifies the video stream from which the currently displayed video chips were generated.

GUI widget 824 is provided to facilitate the cycling through video chip pages for a plurality of video streams. A user may want to cycle through such video chip pages for change detection purposes. The GUI widget 824 is configured to allow manual cycling and/or automatic cycling between video chip pages for a plurality of video streams. As such, the GUI widget 824 includes, but is not limited to, a check box for enabling and disabling video stream cycling operations of the feature analysis plug-in, a slider for setting the rate at which the video streams automatically cycle, and/or a button for manually commanding when to change the video stream.

GUI widget 826 is provided to facilitate the performance of manual-spatial scale operations by the feature analysis plug-in. The manual-spatial scale operations are operative to adjust the spatial zoom level of scale of images of all of the displayed video chips from a first spatial zoom level of scale to a second spatial zoom level of scale in response to a user-software interaction. The first spatial zoom level of scale is a default spatial zoom level of scale (e.g., 100%) or a previously user-selected spatial zoom level of scale (e.g., 50%). The second spatial zoom level of scale is a new user-selected spatial zoom level of scale (e.g., 75%). As such, the GUI widget 826 includes, but is not limited to, a drop down list populated with a plurality of whole number percentage values. The percentage values include, but are not limited to, whole number values between zero and one hundred.

GUI widget 828 is provided to facilitate the viewing of each displayed feature at its best-fit spatial zoom level of scale or its pre-defined maximum spatial zoom level of scale. As such, the GUI widget 828 includes, but is not limited to, a button for enabling and disabling auto-spatial scale operations of the feature analysis plug-in. When the auto-spatial scale operations are enabled, the manual-spatial scale operations are disabled. Similarly, when the auto-spatial scale operations are disabled, the manual-spatial scale operations are enabled.

GUI widget 830 is provided to facilitate the viewing of a plurality of "temporally zoomed" video chips using a feature analysis plug-in. In this regard, it should be understood that temporal resolution operations are initiated via GUI widget 830. The temporal resolution operations involve modifying a temporal level of resolution of at least one video chip. The temporal resolution is modified by (a) altering the temporal resolutions of video chips which precede a selected video chip in a temporal order, (b) altering the temporal resolutions of video chips which succeed the selected video chip in the temporal order, or (c) altering the temporal resolution of only the selected video chip. For example, in scenario (c), a selected video chip has an original temporal level of resolution of one minute. In response to a user-software interaction, the temporal level of resolution of the selected video chip is changed to ten seconds. Consequently, the content of the selected video chip is re-displayed in a plug-in window as six, ten second video chips, rather than one sixty second video chip. Embodiments of the present invention are not limited to the particularities of the above-provided examples. The value of the temporal level of scale can be increased and/or decreased via GUI widget 830. As shown in FIG. 8A, the GUI widget 830 includes, but is not limited to, a button for enabling and disabling temporal resolution operations of the feature analysis plug-in. The GUI widget 830 may also comprise a means (not shown) for selecting a new value (e.g., ten seconds) for the temporal level of resolution (e.g., a text box and a drop down list).

GUI widget 816 is provided to facilitate the writing of all "flagged" video chips to an output file stored in a specified data store (e.g., feature data store 112 of FIG. 1). GUI widget 818 is provided to facilitate the saving of all video chips which have been "flagged" during a session to a user-named file. The user-named file can include, but is not limited to, a shapefile. Shapefiles are well known in the art, and therefore will not be described herein. In some embodiments of the present invention, a video chip is "flagged" by right clicking on the video chip to obtain access to a "chip context" GUI and selecting a "flag" item from the "chip context" GUI.

As evident from the above discussion, the system 100 implements one or more method embodiments of the present invention. The method embodiments of the present invention provide implementing systems with certain advantages over conventional video analysis systems. For example, the present invention provides a system in which an analysis of video data can be performed in a shorter period of time as compared to the amount of time needed to analyze video data using conventional fast forward/fast reverse techniques. The present invention also provides a system in which video data is analyzed much more efficiently than in conventional video data analysis systems. The manner in which the above listed advantages of the present invention are achieved will become more evident as the discussion progresses.

Exemplary Methods of the Present Invention

Figure 3A:
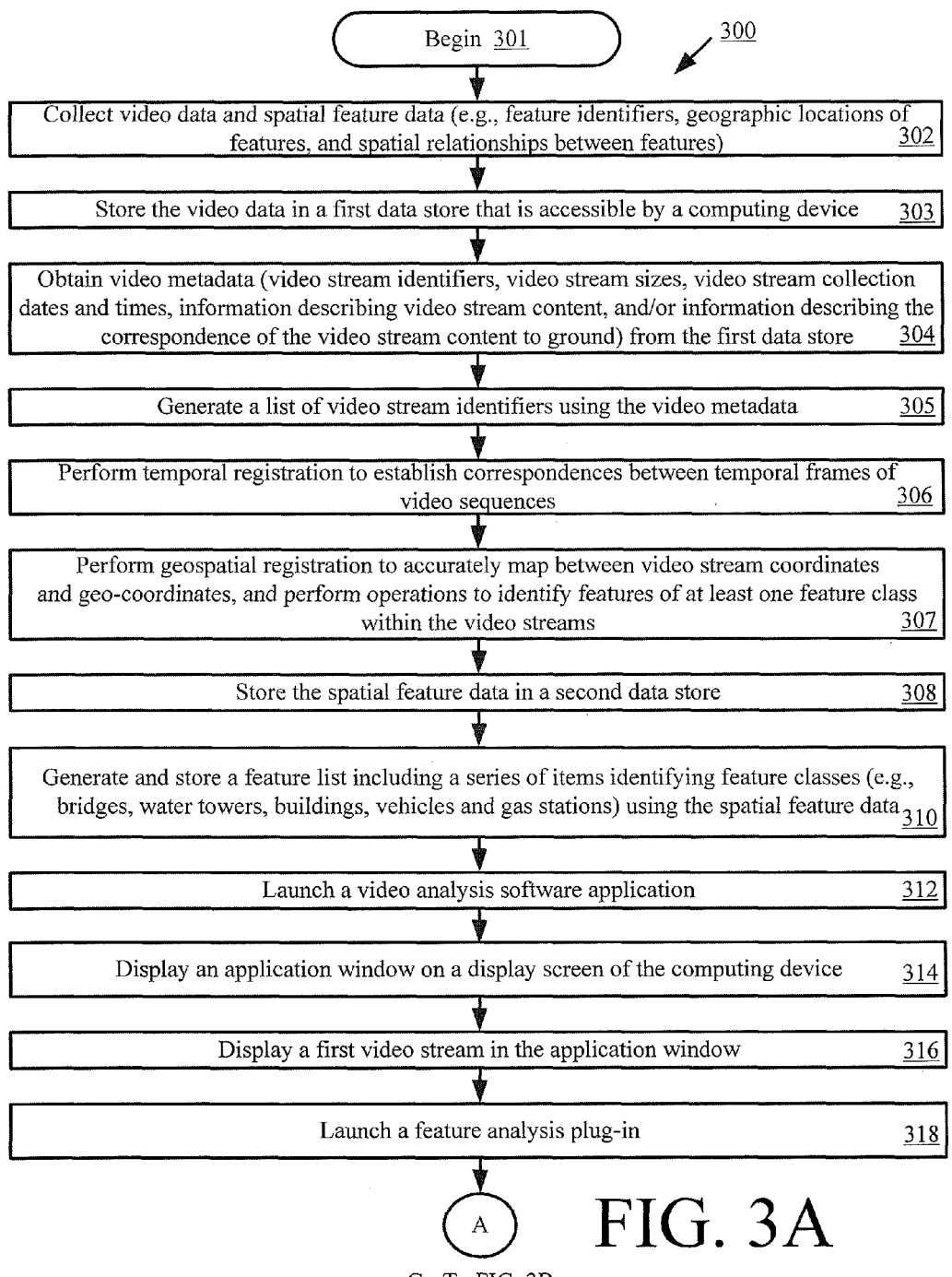
FIGS. 3A-3G collectively provide a flow diagram of an exemplary method for efficient temporal data analysis that is useful for understanding the present invention.

Referring now to FIGS. 3A-3G, there is provided a flow diagram of an exemplary method 300 for efficient video data analysis that is useful for understanding the present invention. As shown in FIG. 3A, the method 300 begins with step 301 and continues with step 302. In step 302, video data and spatial feature data is collected. The spatial feature data can include, but is not limited to, data defining feature identifiers, geographic locations of objects visible in a video stream, and spatial relationships between the objects.

After the video data is collected, it is stored in a first data store (e.g., video data store 110 of FIG. 1) that is accessible by a computing device (e.g., computing device 102 of FIG. 1), as shown by step 303. In a next step 304, video metadata is obtained from the first data store. The video metadata can include, but is not limited to, data defining video stream identifiers, video stream sizes, video stream collection dates and times, video stream content, and the correspondence of video stream content to ground. The video metadata is then used in step 305 to generate a list of video stream identifiers. This list of video stream identifiers will be subsequently used by a feature analysis plug-in to allow a user to select at least one of a plurality of video streams to analyze at any given time.

The video data, video metadata and/or spatial feature data is used in steps 306 and 307 for temporal registration and geospatial registration of the video streams. Methods for temporal registration and geospatial registration are well known in the art, and therefore will not be described herein. However, it should be understood that temporal registration is generally performed to establish correspondences between temporal frames of video sequences. Geospatial registration is generally performed to accurately map between video stream coordinates and geo-coordinates. Any known method for temporal registration and geospatial registration of video streams can be used with the present invention without limitation. Notably, such known techniques may employ place/name databases, GOOGLE® maps, and/or Global Positioning System ("GPS") information. Step 307 also involves performing operations by the feature analysis plug-in to identify features of at least one feature class within the video streams.

Similar to the video data, the spatial feature data is stored in a data store (e.g., feature data store 112 of FIG. 1) after it is collected, as shown by step 308. The spatial feature data is used in step 310 to generate a feature list including a series of items identifying feature classes (e.g., bridges, water towers, buildings, vehicles and gas stations). Subsequently, the feature list is stored in the data store (e.g., data store 112 of FIG. 1).

Figure 4:
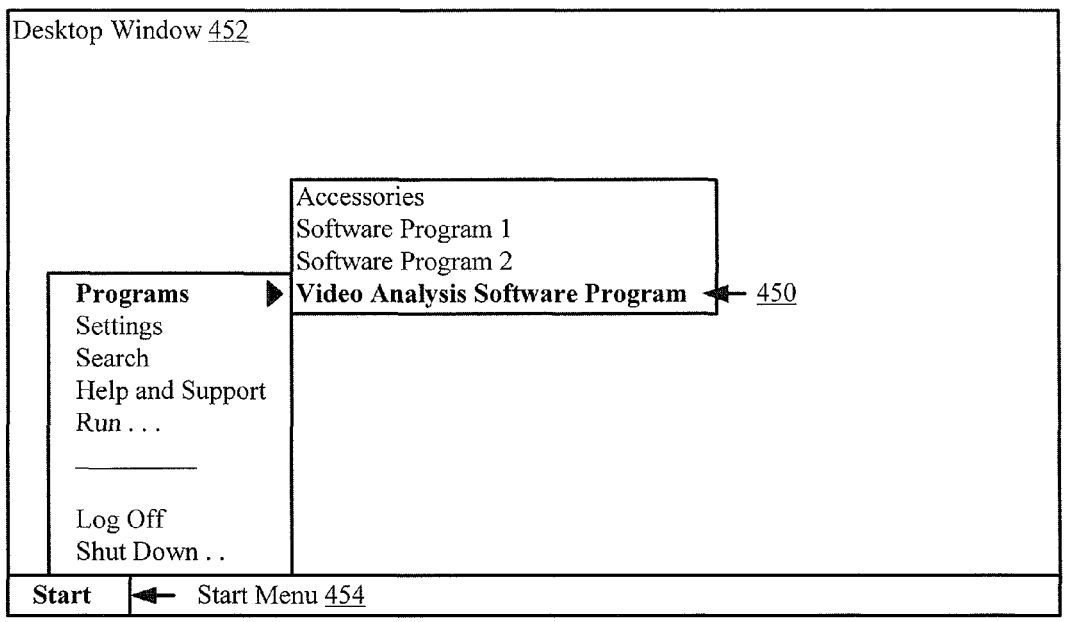
FIG. 4 is a schematic illustration of an exemplary desktop window that is useful for understanding the present invention.

Upon completing step 310, the method continues with step 312 where a VA software application is launched. The VA software application can be launched in response to a user software interaction. For example, as shown in FIG. 4, a VA software application can be launched by accessing and selecting a "Video Analysis Software Program" entry 450 on a start menu 454 of a desktop window 452.

Figure 5:
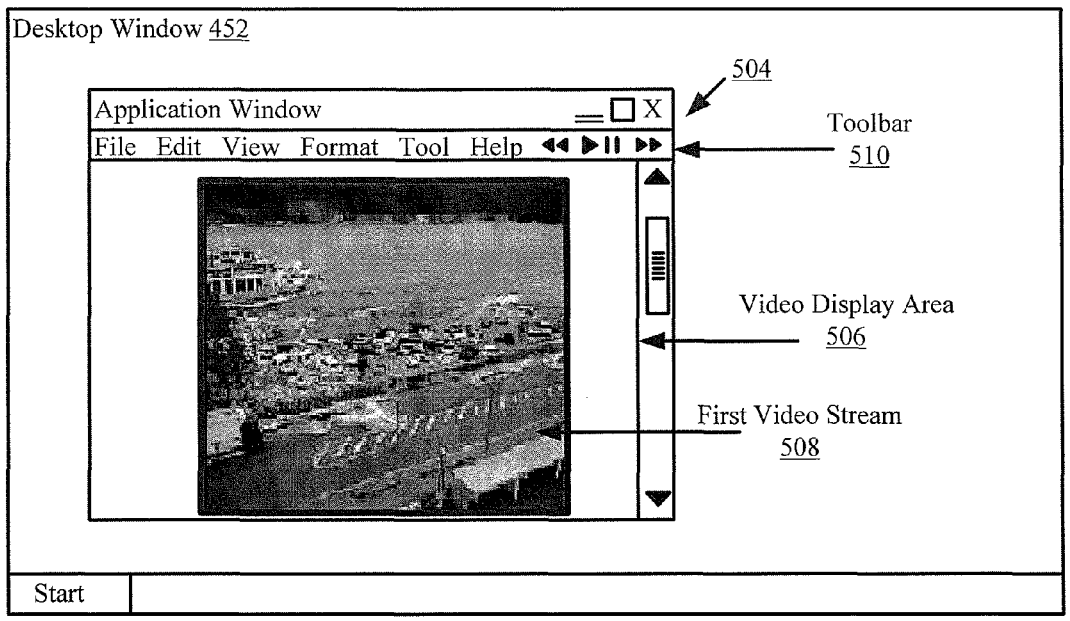
FIG. 5 is a schematic illustration of an exemplary application window that is useful for understanding the present invention.

In a next step 314, an application window is displayed on top of the desktop window. A schematic illustration of an exemplary application window is provided in FIG. 5. As shown in FIG. 5, the application window 504 includes a toolbar 510 including GUI widgets for at least fast reversing a video stream, playing a video stream, pausing a video stream, fast forwarding a video stream, and launching a plug-in. The application window 504 also includes a video display area 506 in which a video stream can be presented to a user of the computing device (e.g., computing device 102 of FIG. 1).

Referring again to FIG. 3A, a first video stream is displayed in the application window, as shown in step 316. A schematic illustration showing an exemplary first video stream 508 displayed in an application window 504 is provided in FIG. 5. The first video stream 508 contains video data relating to the destruction of a feature of interest (e.g., a visual representation of a bridge) during a flood. Embodiments of the present invention are not limited in this regard.

Figure 6:
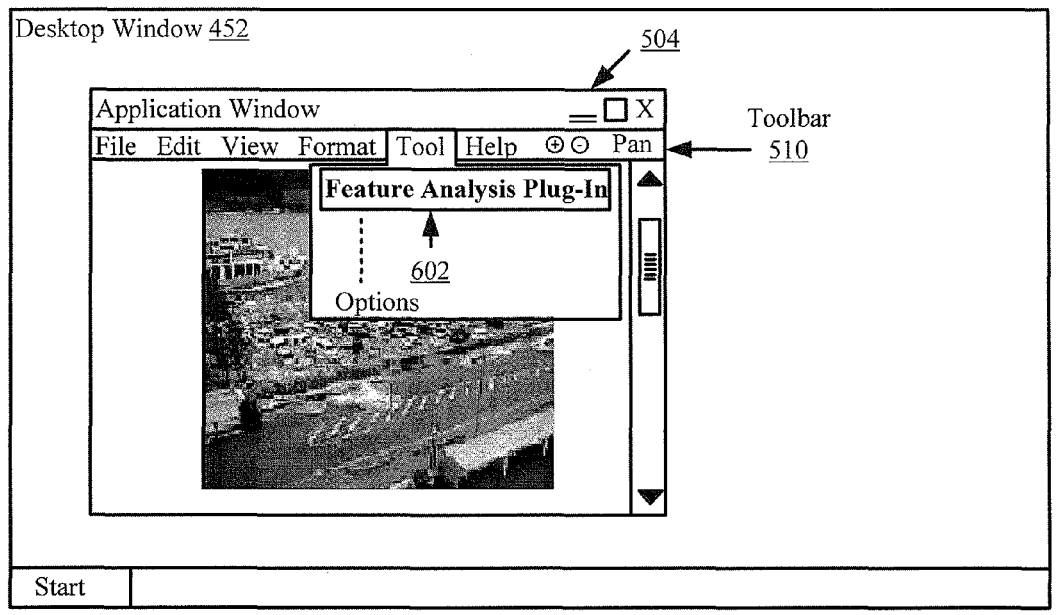
FIG. 6 is a schematic illustration of an exemplary application window that is useful for understanding the present invention.

After the first video stream is presented to a user of the computing device (e.g., computing device 102 of FIG. 1), a feature analysis plug-in is launched, as shown by step 318. The feature analysis plug-in can be launched in response to a user-software interaction. For example, as shown in FIG. 6, a feature analysis plug-in is launched by selecting an item 602 of a drop down menu of a toolbar 510. Once the feature analysis plug-in is launched, the method 300 continues with step 319 of FIG. 3B.

Figure 3B:
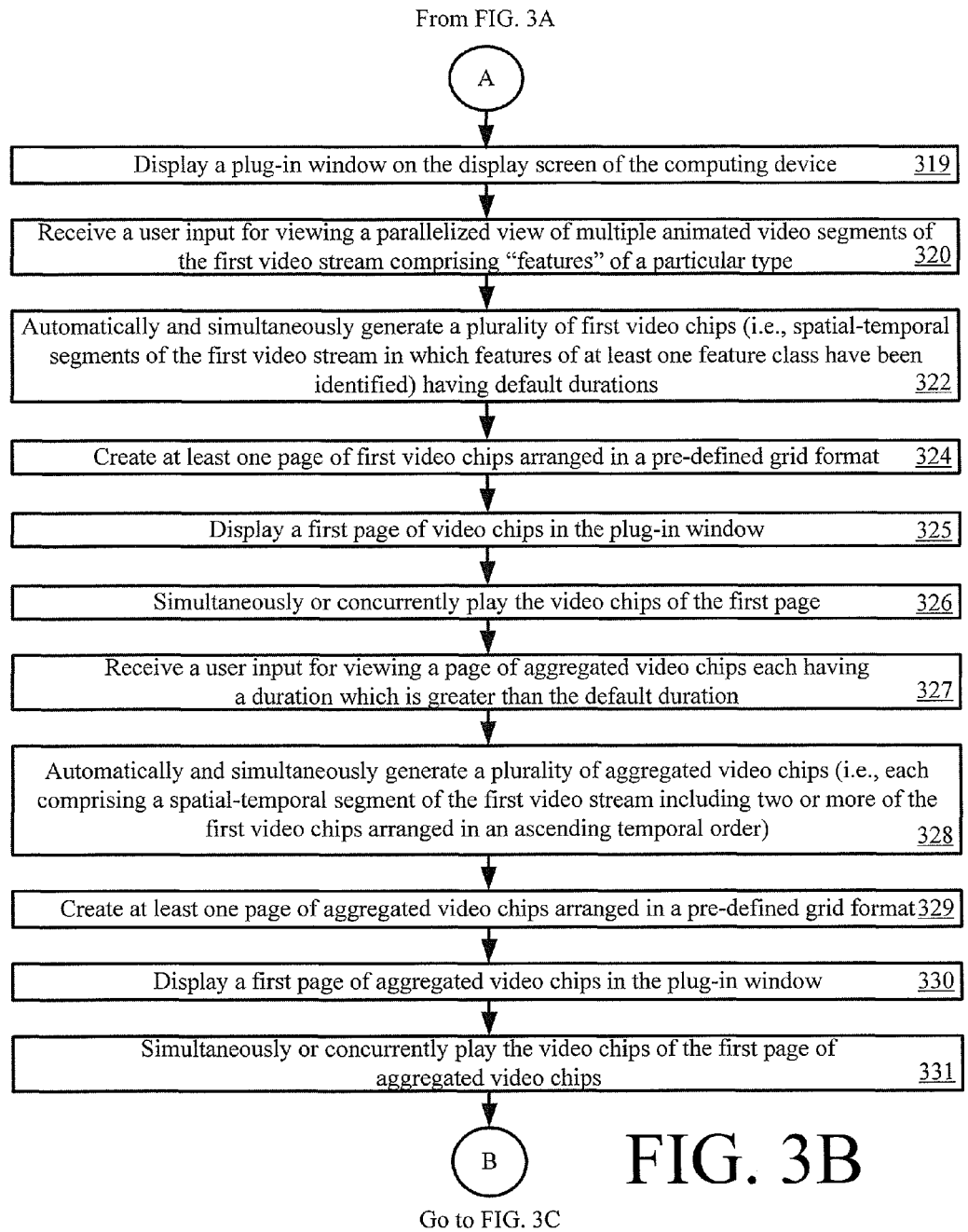
Figure 7:
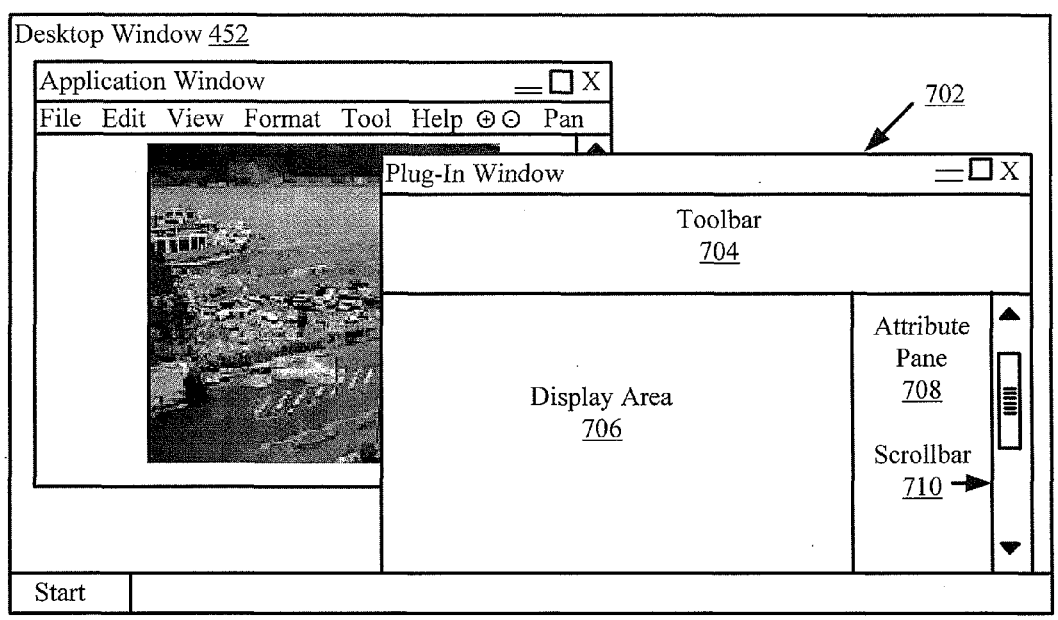
FIG. 7 is a schematic illustration of an exemplary plug-in window that is useful for understanding the present invention.
Figure 8:
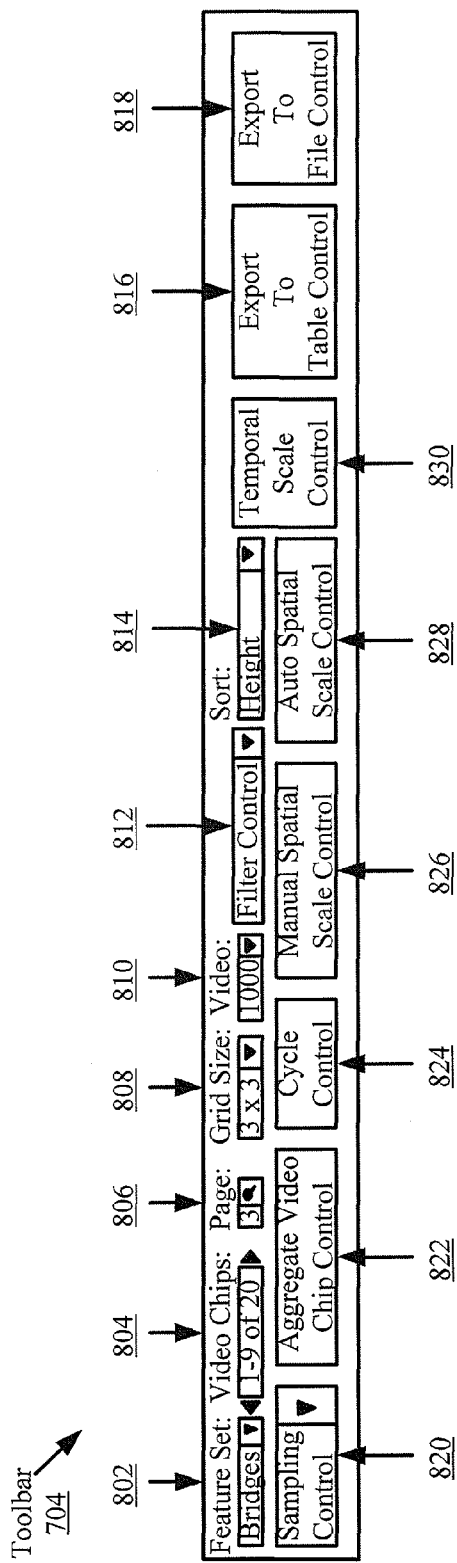
FIG. 8A is a schematic illustration of an exemplary toolbar of a plug-in window that is useful for understanding the present invention.
FIG. 8B is a schematic illustration of an exemplary drop down box that is useful for understanding the present invention.

Referring now to FIG. 3B, step 319 involves displaying a plug-in window on top of the desktop window and/or application window. A schematic illustration of an exemplary plug-in window 702 is provided in FIG. 7. As shown in FIG. 7, the plug-in window 702 comprises a toolbar 704, a display area 706, an attribute pane 708, and a scrollbar 710. A schematic illustration of the toolbar 704 is provided in FIG. 8A. As shown in FIG. 8A, the toolbar 704 comprises a plurality of exemplary GUI widgets 802-830. Each of the GUI widgets 802-830 is described above in detail.

Referring again to FIG. 3B, a next step 320 involves receiving a user input for viewing a paralyzed view of multiple animated video segments of the first video stream comprising "features" of a particular type. In response to the user-software interaction of step 320, the method 300 continues with step 322 where the feature analysis plug-in automatically and concurrently generates a plurality of first video chips. The first video chips are generated using the feature list generated in previous step 310, the spatial feature data for the features which are of the particular type, the video metadata and/or the video data for the first video stream. Each of the first video chips includes a spatial-temporal segment of the first video stream which comprises at least one previously identified feature. The feature may be used as a "finger print" for purposes of matching, change detection, causality identification, feature maintenance and performing other tasks. The first video chips can have a default temporal level of resolution (e.g., thirty seconds, one minute, or two plus minutes) and/or a default spatial zoom level of scale or resolution.

Figure 9:
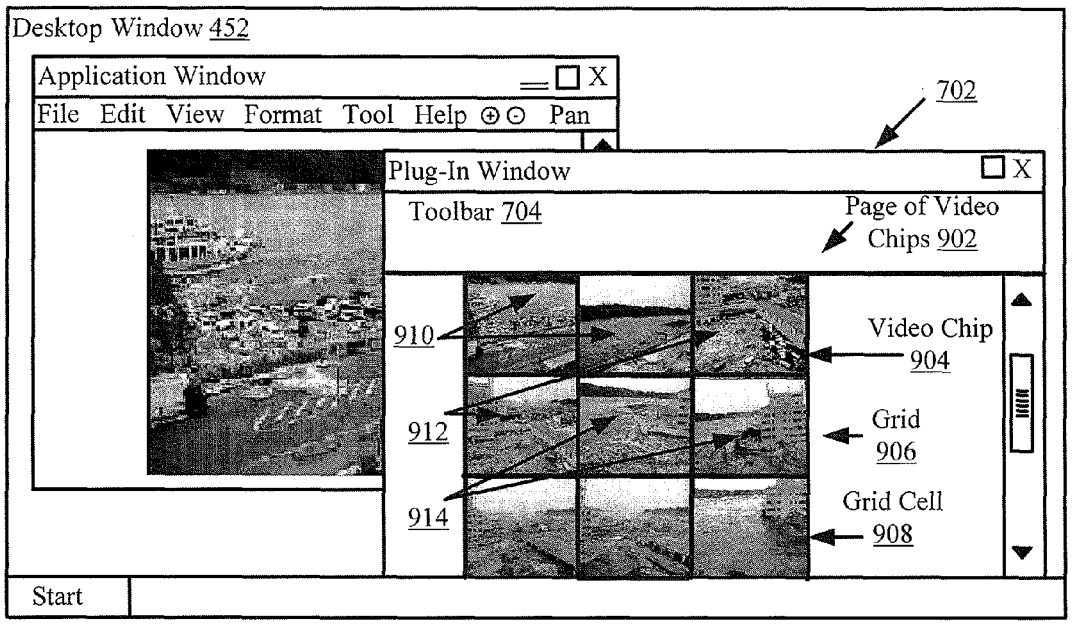
FIG. 9 is a schematic illustration of an exemplary page of video chips that is useful for understanding the present invention.
Figure 10:
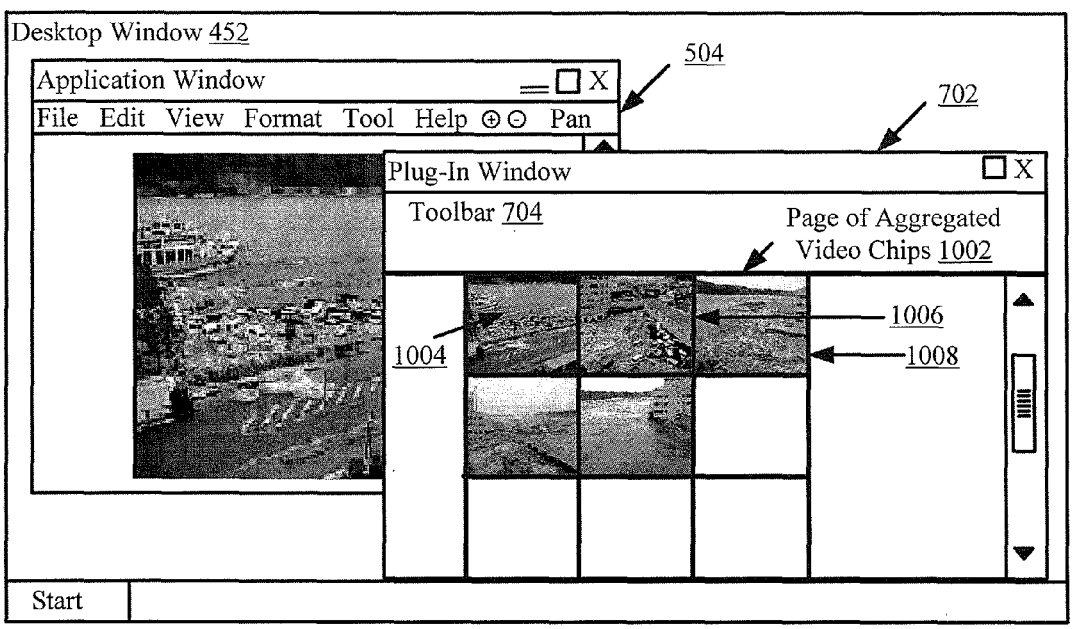
FIG. 10 is a schematic illustration of an exemplary page of aggregated video chip images that is useful for understanding the present invention.

Upon completing step 322, step 324 is performed where at least one page of first video chips is created by the feature analysis plug-in. The first video chips are arranged on the page in a grid or matrix format. The grid or matrix of the video chips has a default size (e.g., ten cells by ten cells) or a user-specified size (e.g., three cells by three cells). In a next step 325, a first page of video chips is displayed in a plug-in window. A schematic illustration of a displayed page of video chips 902 is provided in FIG. 9. As shown in FIG. 9, the page 902 comprises a grid 906 defined by a plurality of grid cells 908. A different video chip 904 is presented within each grid cell 908 of the grid 906. Upon completing step 325, the method 300 continues with step 326. In step 326, the displayed video chips are simultaneously or concurrently played.

In a next step 327, a user input is received by the computing device for viewing a page of aggregated video chips. Each of the aggregated video chips has a duration (e.g., one minute) which is greater than the default duration (e.g., thirty seconds). The user input is facilitated by a GUI widget (e.g., GUI widget 822 of FIG. 8A) of the plug-in window (e.g., the plug-in window 702 of FIG. 7). The GUI widget may be configured to allow a user to enable an aggregation function of the feature analysis plug-in, specify which video chips should be aggregated, and/or define how many video chips should be combined to form each of a plurality of combined video chips. As such, the GUI widget 822 may include, but is not limited to, a button for enabling and disabling the aggregation function of the feature analysis plug-in, a means for specifying which video chips should be aggregated, and/or a means for defining how many video chips should be combined to form each combined video chip (e.g., a text box and a drop down list).

Referring again to FIG. 3B, the method 300 continues with step 328. In step 328, the feature analysis plug-in automatically and simultaneously generates a plurality of aggregated video chips. Each aggregated video chip comprises a spatial-temporal segment of the first video stream including two or more of the first video chips arranged in an ascending temporal order. Also, each of the aggregated video chips has a duration that is greater than the duration of each of its counterparts (i.e., the first video chips which were aggregated). Thereafter, in step 329, at least one page of aggregated video chips is created by the feature analysis plug-in. The aggregated video chips are arranged within the page in a grid or matrix format. A schematic illustration of an exemplary page of aggregated video chips 1002 is provided in FIG. 10. Each of the aggregated video chips is an aggregation of two first video chips 904 of FIG. 9. For example, aggregated video chip 1004 is an aggregation of video chips 910 of FIG. 9. Aggregated video chip 1006 is an aggregation of video chips 912 of FIG. 9. Aggregated video chip 1008 is an aggregation of video chips 914 of FIG. 9, and so on. Embodiments of the present invention are not limited in this regard. The page of aggregated video chips is then displayed in the plug-in window, as shown by step 330. Upon completing step 330, step 331 is performed where the aggregated video chips are simultaneously or concurrently played.

Figure 3C:
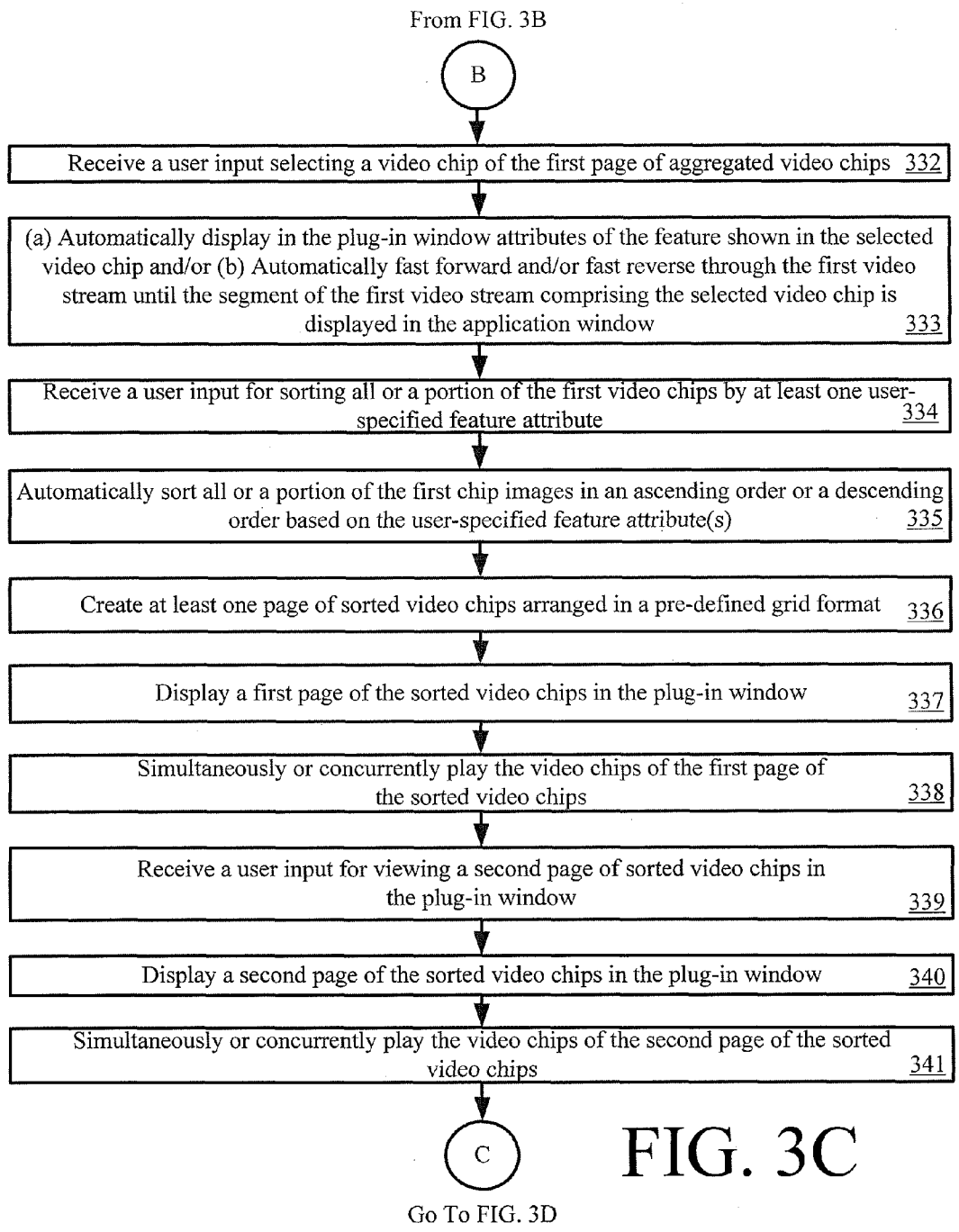
Figure 11:
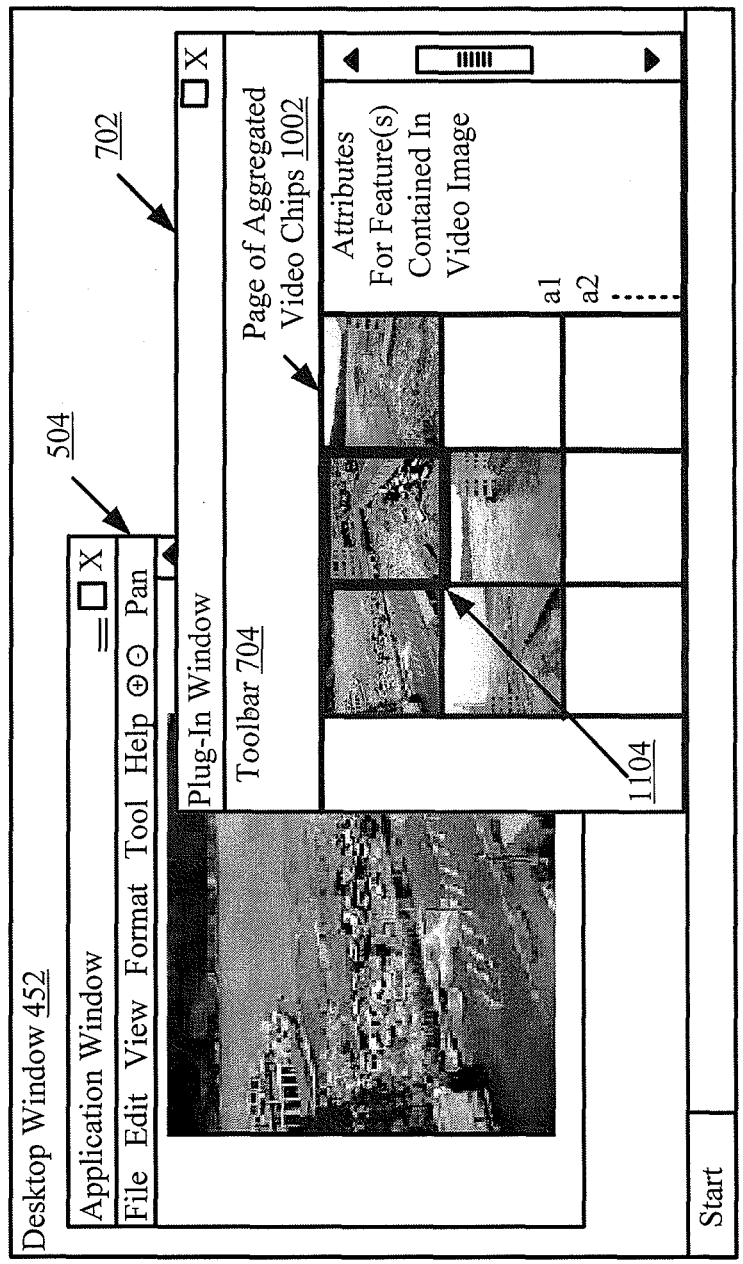
FIG. 11 is a schematic illustration of an exemplary page of aggregated video chips that is useful for understanding the present invention.

Subsequently, the method 300 continues with step 332 of FIG. 3C. Step 332 involves receiving a user input selecting a video chip of the first page of aggregated video chips. The video chip can be selected by moving a mouse cursor over the video chip and clicking a mouse button. A schematic illustration of a selected video chip 1004 is provided in FIG. 11. As shown in FIG. 11, the selected video chip 1104 is annotated with a relatively thick and distinctly colored border. Embodiments of the present invention are not limited in this regard. Any type of mark or annotation can be used to illustrate that a particular video chip has been selected.

In response to this user input, step 333 is performed where attribute information for the feature contained in the selected video chip is displayed in an attribute pane (e.g., attribute pane 708 of FIG. 7) of the plug-in window (e.g., plug-in window 702 of FIG. 7). A schematic illustration of an exemplary plug-in window 702 is provided in FIG. 11 which has attribute information a1, a2 displayed therein. Step 333 may also involve automatically fast forwarding and/or fast reversing the first video stream displayed in the application window until the segment thereof comprising the selected video chip is displayed in the application window.

In a next step 334, a user input is received by the computing device for sorting all or a portion of the first video chips based on at least one attribute of the features contained therein. The user input is facilitated by a GUI widget (e.g., GUI widget 814 of FIG. 8A) of the plug-in window (e.g., the plug-in window 702 of FIG. 7). The GUI widget may be configured to allow a user to specify the attribute(s) that the sorting should be based on, and/or specify whether the video chips should be sorted in an ascending order or a descending order.

Figure 12:
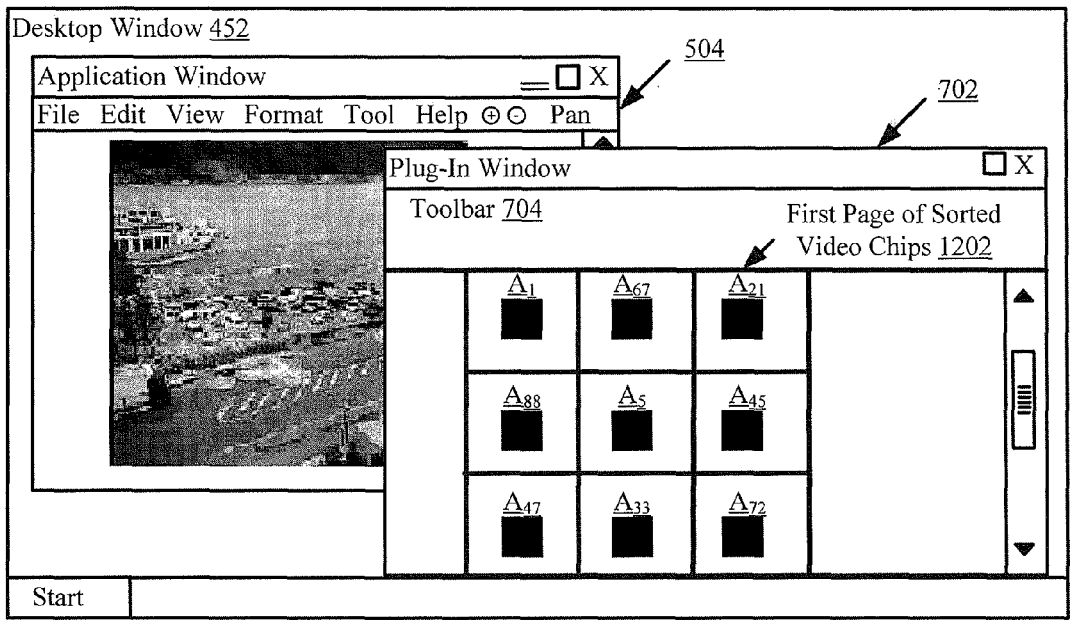
FIGS. 12 and 13 each provide a schematic illustration of an exemplary page of sorted video chips that is useful for understanding the present invention.

In response to the user input of step 334, all or a portion of the first video chips are sorted in an ascending order or a descending order based on the user-specified feature attribute(s), as shown by step 335. Thereafter in step 336, at least one page of sorted video chips is created by the feature analysis plug-in. The sorted video chips are arranged on the page in a pre-defined grid format or a matrix format. A first page of sorted video chips is then displayed in the plug-in window, as shown by step 337. The first page of sorted video chips may or may not include the same segments of the first video stream as the first page of first video chips. For example, if the first grid has a grid size of three cells by three cells, then video chips one through nine of one hundred video chips are presented therein. Thereafter, an ordered list is generated by sorting the one hundred video chips by at least one attribute (e.g., height). In this scenario, the first grid is updated to include the first nine video chips identified in the ordered list. These first nine video chips of the ordered list may include one or more of the original video chips (e.g., views 1-9), as well as one or more video chips (e.g., views 10-100) different than the original video chips. A schematic illustration of an exemplary first page of sorted video chips 1202 is provided in FIG. 12. As shown in FIG. 12, the first page of sorted video chips 1202 includes the video chips $A_1, A_{67}, A_{21}, A_{88}, A_5, A_{45}, A_{47}, A_{33}, A_{72}$. Notably, none of the video chips $A_1, A_{67}, A_{21}, A_{88}, A_5, A_{45}, A_{47}, A_{33}, A_{72}$ is contained in the first page of video chips 902 of FIG. 9. Embodiments of the present invention are not limited in this regard. For example, the first page of sorted video chips 1202 can alternatively include one or more of the video chips contained in page 902 of FIG. 9. After the first page of sorted video chips is displayed in the plug-in window, step 338 is performed where the video chips are simultaneously or concurrently played.

In a next step 339, a user input is received by the computing device for viewing a second page of sorted video chips in the plug-in window. The user input is facilitated by a GUI widget (e.g., GUI widget 804 or 806 of FIG. 8A) of the plug-in window (e.g., the plug-in window 702 of FIG. 7). The GUI widget may be configured to facilitate moving through pages of unsorted and/or sorted video chips. In this regard, the GUI widget includes arrow buttons that allow a user to move forward and backward through the pages of unsorted and/or sorted video chips. Alternatively or additionally, the GUI widget may be configured to facilitate jumping to a desired page of unsorted and/or sorted video chips for review. In this regard, the GUI widget includes a text box for entering a page number and a search button for causing the page of unsorted and/or sorted video chips having the entered page number to be displayed in the display area (e.g., display area 706 of FIG. 7) of the plug-in window (e.g., plug-in window 702 of FIG. 7).

Figure 13:
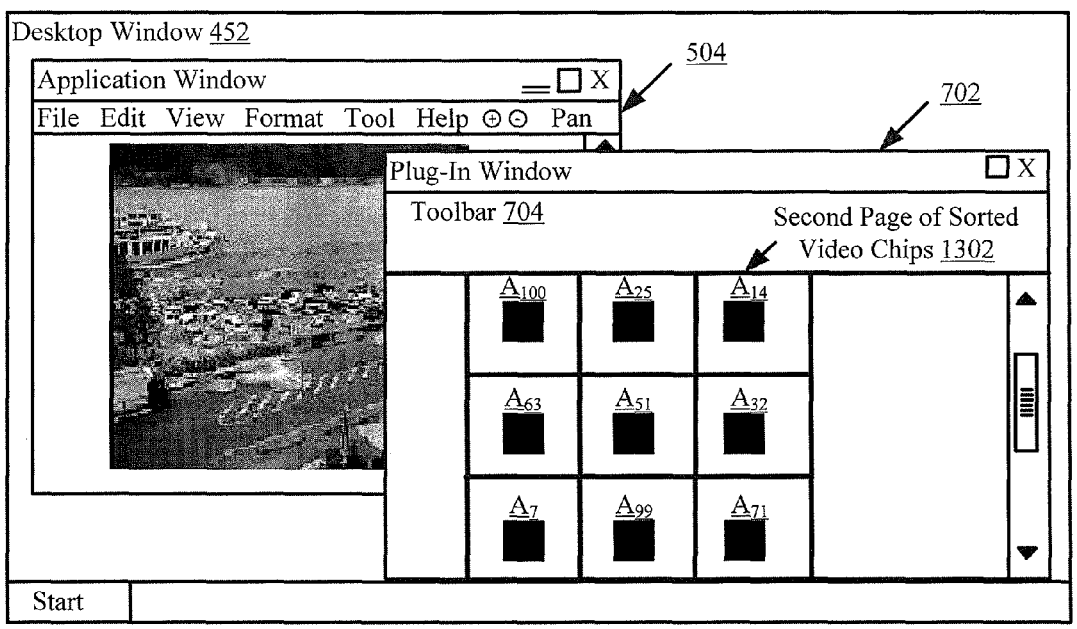

After the user input is received in step 339, step 340 where a second page of the sorted video chips is displayed in the plug-in window. A schematic illustration of an exemplary second page of sorted video chips 1302 is provided in FIG. 13. As shown in FIG. 13, the second page of sorted video chips 1302 includes the video chips $A_{100}, A_{25}, A_{14}, A_{63}, A_{51}, A_{32}, A_7, A_{99}, A_{71}$. Thereafter, the sorted video chips are simultaneously or concurrently played, as shown by step 341. Upon completing step 341, the method 300 continues with step 342 of FIG. 3D.

Figure 3D:
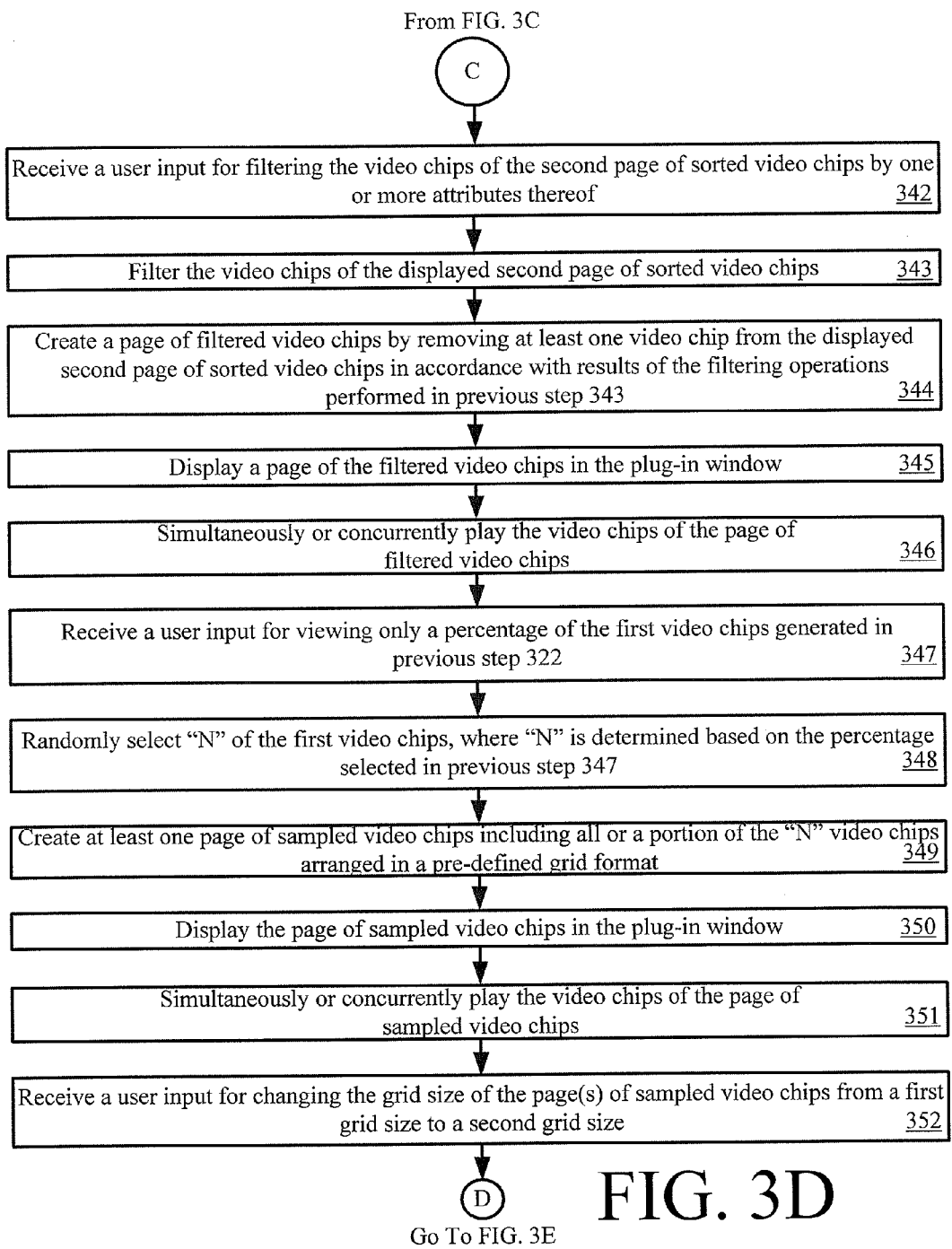

As shown in FIG. 3D, step 342 involves receiving, by a computing device, a user input for filtering the video chips of the second page of sorted video chips by one or more feature attributes thereof. The user input is facilitated by a GUI widget (e.g., GUI widget 812 of FIG. 8A) of the plug-in window (e.g., the plug-in window 702 of FIG. 7). The GUI widget is configured to facilitate a selection of features for display in the display area (e.g., display area 706 of FIG. 7) of the plug-in window (e.g., plug-in window 702 of FIG. 7) based on their attributes. In this regard, the GUI widget may include, but is not limited to, a "filter control" button and a "filter setting" drop down button. The "filter control" button facilitates the enablement and disablement of an attribute filter function. The "filter setting" drop down button facilitates the display of a drop-down box for assembling a query phrase defining an attribute filter (e.g., ["HEIGHT"='100 Feet'], ["HEIGHT"<'100 Feet'], ["HEIGHT"< >'100 Feet'], ["HEIGHT" IS NULL], ["HEIGHT" IS NOT NULL], ["HEIGHT"≥'100 Feet' AND "DIAMETER">'40 Feet'], or ["HEIGHT"≤'100 Feet' OR "DIAMETER">'40 Feet']). A schematic illustration of an exemplary drop-down box 850 is provided in FIG. 8B.

Figure 14:
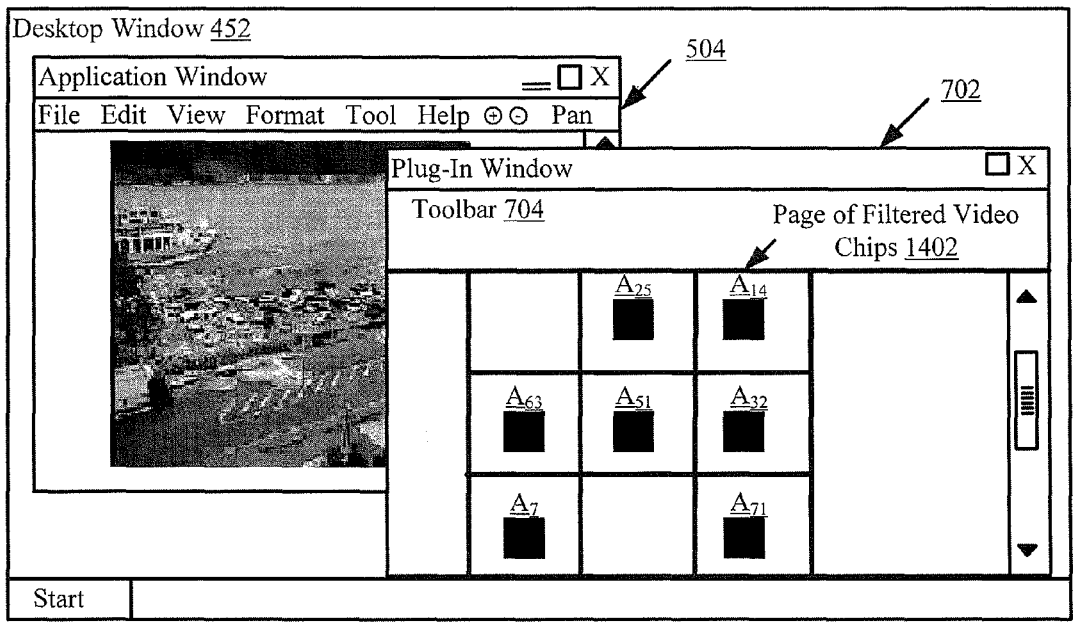
FIG. 14 is a schematic illustration of an exemplary page of filtered video chips that is useful for understanding the present invention.

Upon receipt of the user input in step 342, the feature analysis plug-in performs operations to filter the video chips of the displayed second page of sorted video chips, as shown by step 343. In a next step 344, a page of filtered video chips is created by the feature analysis plug-in. The page of filtered video chips is created by removing at least one video chip from the displayed second page of sorted video chips in accordance with the results of the filtering operations performed in previous step 353. Thereafter, the page of filtered video chips is displayed in the display area (e.g., display area 706 of FIG. 7) of the plug-in window (e.g., plug-in window 702 of FIG. 7), as shown by step 345. The displayed filtered video chips are then simultaneously or concurrently played in step 346. A schematic illustration of an exemplary page of filtered video chips 1402 is provided in FIG. 14. As shown in FIG. 14, the page of filtered video chips 1402 includes the video chips $A_{25}, A_{14}, A_{63}, A_{51}, A_{32}, A_7, A_{71}$ contained in the second page of sorted video chips 1302 of FIG. 13. However, the page of filtered video chips 1402 does not include video chips $A_{100}$ and $A_{99}$ in grid cells thereof. In this regard, it should be understood that video chips $A_{100}$ and $A_{99}$ have been removed from the second page of sorted video chips 1302 of FIG. 13 to obtain the page of filtered video chips 1402. Embodiments of the present invention are not limited in this regard.

Referring again to FIG. 3D, the method 300 continues with step 347 where the computer device receives a user input for viewing only a portion (e.g., a percentage) of the video chips generated in previous step 322. The user input is facilitated by a GUI widget (e.g., GUI widget 820 of FIG. 8A) of the plug-in window (e.g., the plug-in window 702 of FIG. 7). The GUI widget is configured to facilitate the display of a random sample of video chips of features of a particular feature class for visual inspection. As such, the GUI widget may include, but is not limited to, a button for enabling/disabling a random sampling function of the feature analysis plug-in and a drop down menu from which a percentage value can be selected.

In response to the reception of the user input in step 347, step 348 is performed where "N" video chips of the first video chips generated in previous step 322 are randomly selected. The value of "N" is determined based on the percentage value selected in previous step 347. For example, if one hundred first video chips were generated in step 322 and the percentage value of twenty was selected in step 347, then twenty video chips would be randomly selected from the one hundred first video chips. Embodiments of the present invention are not limited in this regard.

Upon completing step 348, step 349 is performed where the feature analysis plug-in creates at least one page of sampled video chips including all or a portion of the "N" video chips arranged in a grid or matrix format. Notably, the pages of sampled video chips can have a default grid size or a user-specified grid size. For example, if a grid size is four cells by four cells and "N" equals twenty, then two pages of sampled video chips would be created in step 349 since each page can contain a maximum of sixteen video chips. In contrast, if the grid size is five cells by five cells and "N" equals twenty, then only one page of sampled video chips would be created in step 349 since the page can contain a maximum of twenty-five video chips. Embodiments of the present invention are not limited in this regard. In a next step 350, the page of sampled video chips is displayed in the plug-in window. Thereafter, the sampled video chips are simultaneously or concurrently played, as shown by step 351.

Figure 15:
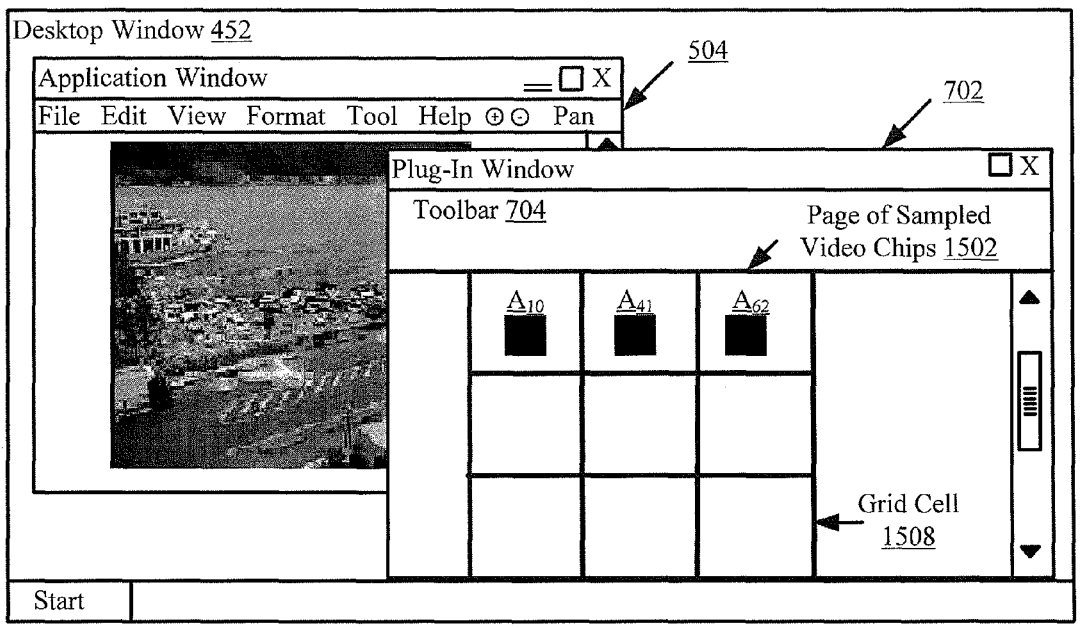
FIG. 15 is a schematic illustration of an exemplary page of sampled video chips that is useful for understanding the present invention.

A schematic illustration of an exemplary page of sampled video chips 1502 is provided in FIG. 15. As shown in FIG. 15, the page of sampled video chips 1502 includes only three video chips $A_{10}$, $A_{41}$, $A_{62}$. In this regard, the total number of first video chips is nine and the percentage selected in step 347 is thirty-three percent. Accordingly, the value of "N" is three. The three video chips contained in the page 1502 were randomly selected from the nine first video chips. Embodiments of the present invention are not limited to the particularities of this example.

Referring again to FIG. 3D, the method 300 continues with step 352 where the computing device receives a user input for changing a grid size of the page(s) of sampled video chips from a first grid size (e.g., three cells by three cells) to a second grid size (e.g., two cells by two cells). The user input is facilitated by a GUI widget (e.g., GUI widget 808 of FIG. 8A) of the plug-in window (e.g., the plug-in window 702 of FIG. 7). The GUI widget is configured to facilitate a selection of a grid size from a plurality of pre-defined grid sizes. As such, the GUI widget may include, but is not limited to, a drop down list listing a plurality of pre-defined grid sizes.

Figure 3E:
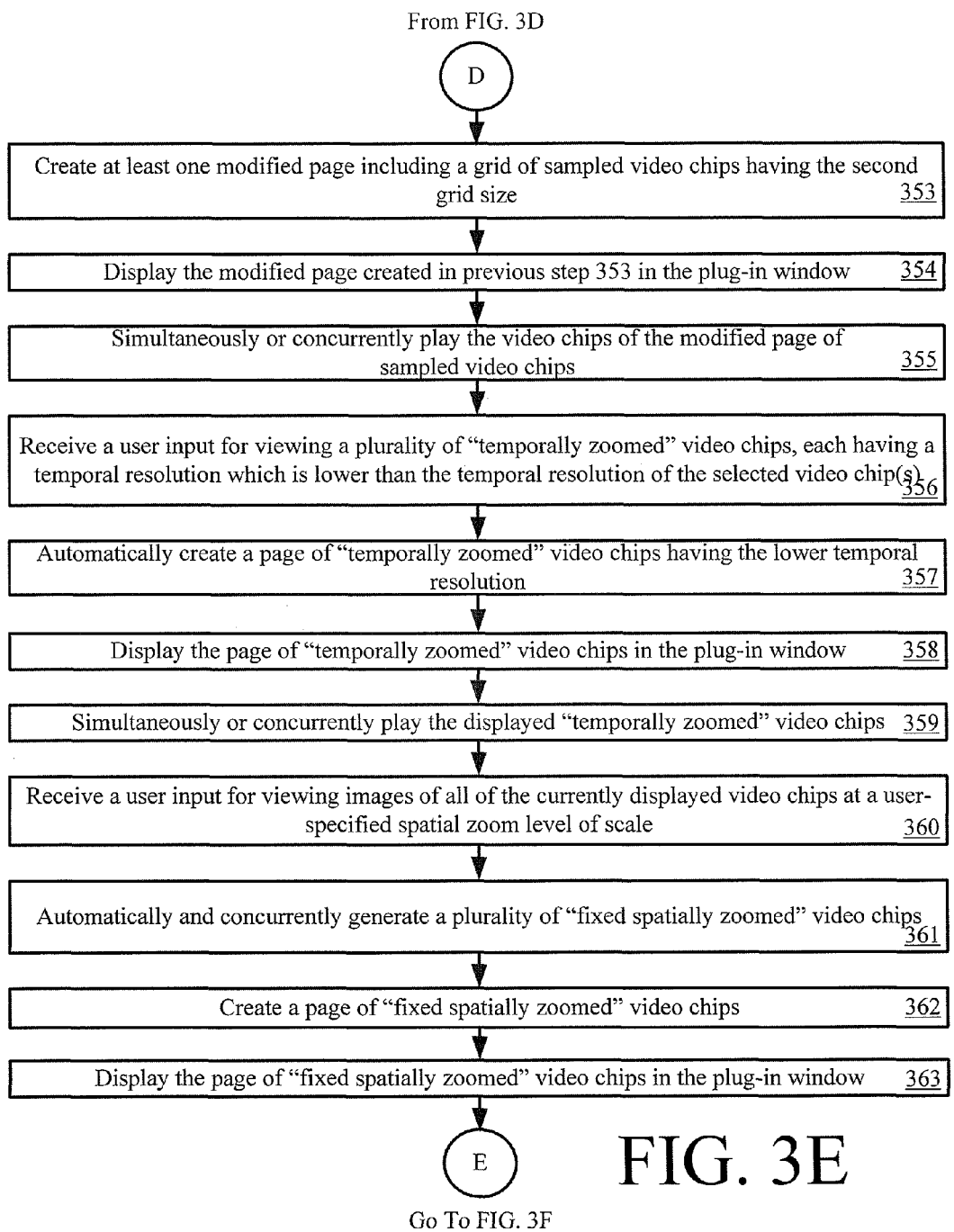

In response to the reception of the user input in step 352, step 353 of FIG. 3E is performed. As shown in FIG. 3E, step 353 involves creating at least one modified page including a grid of sampled video chips having the second grid size. The modified page is then displayed in the plug-in window, as shown by step 354. In a next step 355, the video chips of the modified page of sampled video chips are simultaneously or concurrently played.

Figure 16:
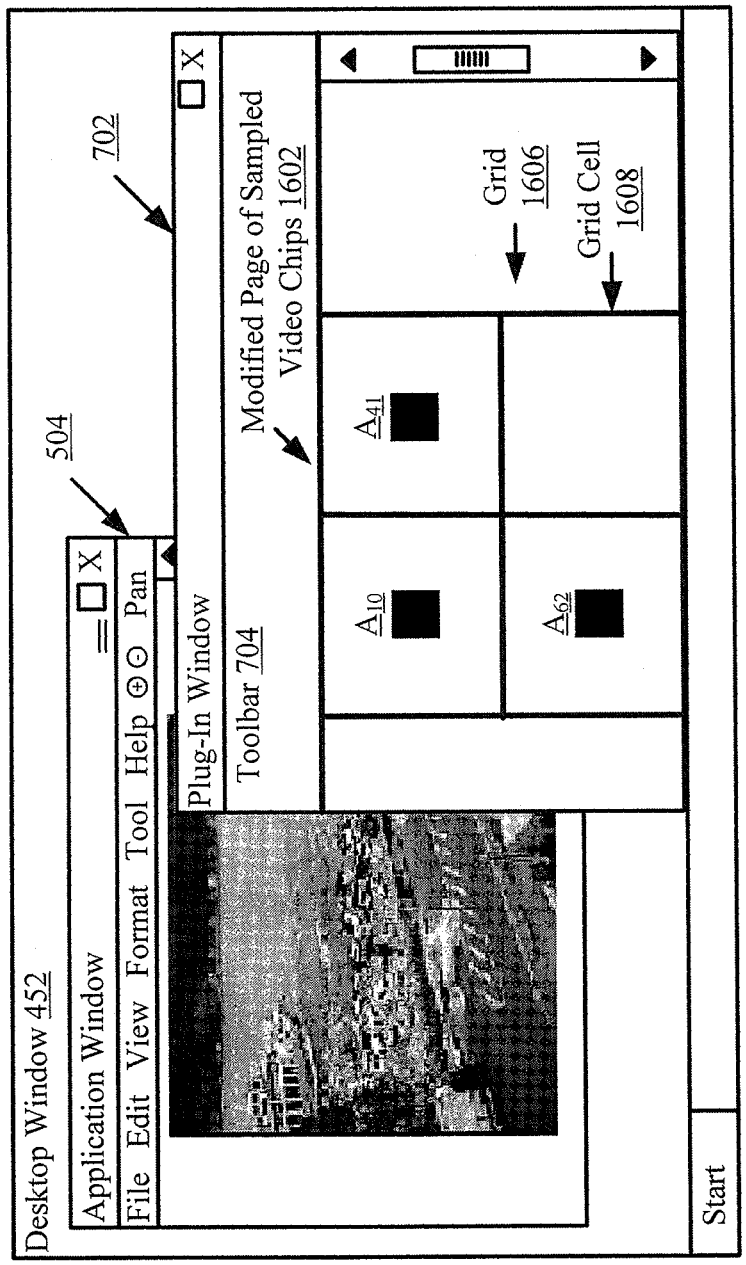
FIG. 16 is a schematic illustration of an exemplary modified page of sampled video chips that is useful for understanding the present invention.

A schematic illustration of an exemplary modified page of sampled video chips 1602 is provided in FIG. 16. As shown in FIG. 16, the modified page 1602 comprises a grid 1606 with a grid size of two cells by two cells. Each of the four grid cells 1608 includes a video chip $A_{10}$, $A_{41}$, $A_{62}$. The video chips are the same as the video chips in the page of sampled video chips 1502 of FIG. 15. Embodiments of the present invention are not limited in this regard. For example, the modified page 1602 may include less or more than the total number of video chips contained in page 1502. In the "less than" scenario, the absence of certain video chips from page 1602 would be a result of the reduction in grid size from three cells by three cells to two cells by two cells. In the "more than" scenario, the inclusion of certain video chips in page 1602 would be a results from an increase in grid size. Notably, the display area for each video chip of page 1602 is larger than the display area for each video chip of page 1502. This increase of display area for the video chips is also a result of the reduction in grid size from three cells by three cells to two cells by two cells. It should also be noted that larger portions of the images of the first video stream surrounding features thereof are displayed in the grid cells 1608 as compared to that displayed in corresponding grid cells 1508 of FIG. 15. This increase in surrounding portions of the video stream images is at least partially due to the reduction in grid size as well as the fact that the video chips of grid cells 1608 have the same spatial zoom level of scale or resolution. Embodiments of the present invention are not limited in the particularities of FIG. 16.

Figure 17:
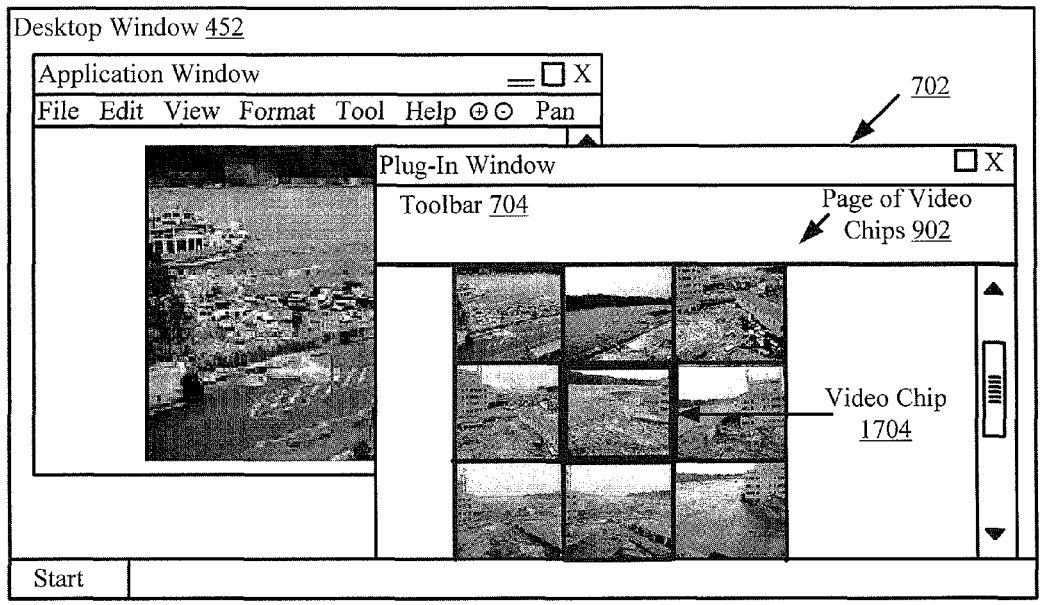
FIG. 17 is a schematic illustration of an exemplary selected video chip that is useful for understanding the present invention.

Referring again to FIG. 3E, the method 300 continues with step 356. In step 356, the computing device receives a user input for viewing a plurality of "temporally zoomed" video chips comprising at least one selected video chip. Each of the "temporally zoomed" video chips has a temporal resolution (or duration) which is lower than the temporal resolution of the selected video chip(s). The video chip can be selected by moving a mouse cursor over the video chip and clicking a mouse button. A schematic illustration of an exemplary selected video chip 1704 is provided in FIG. 17. As shown in FIG. 17, the selected video chip 1704 is annotated with a relatively thick and distinctly colored border. Embodiments of the present invention are not limited in this regard. Any type of mark or annotation can be used to illustrate that a particular video chip has been selected.

The user input of step 356 is facilitated by a GUI widget (e.g., GUI widget 830 of FIG. 8A) of the plug-in window (e.g., plug-in window 702 of FIG. 4). The GUI widget allows a user to modify a temporal level of resolution of at least one selected video chip. For example, a selected video chip has an original temporal level of resolution of one minute. In response to a user-software interaction, the temporal level of resolution of the selected video chip is changed to ten seconds. Embodiments of the present invention are not limited in this regard. The value of the temporal level of resolution can be increased and/or decreased via GUI widget. In this regard, the GUI widget includes, but is not limited to, a button for enabling and disabling temporal resolution operations of the feature analysis plug-in. The GUI widget may also comprise a means for selecting a new value (e.g., ten seconds) for the temporal level of scale (e.g., a text box and a drop down list).

After the reception of the user input in step 356, the feature analysis plug-in performs operations for automatically creating a page of "temporally zoomed" video chips having the lower temporal resolution. Thereafter, in step 358, the page of "temporally zoomed" video chips is displayed in the plug-in window. In a next step 359, the "temporally zoomed" video chips are simultaneously or concurrently played.

Figure 18:
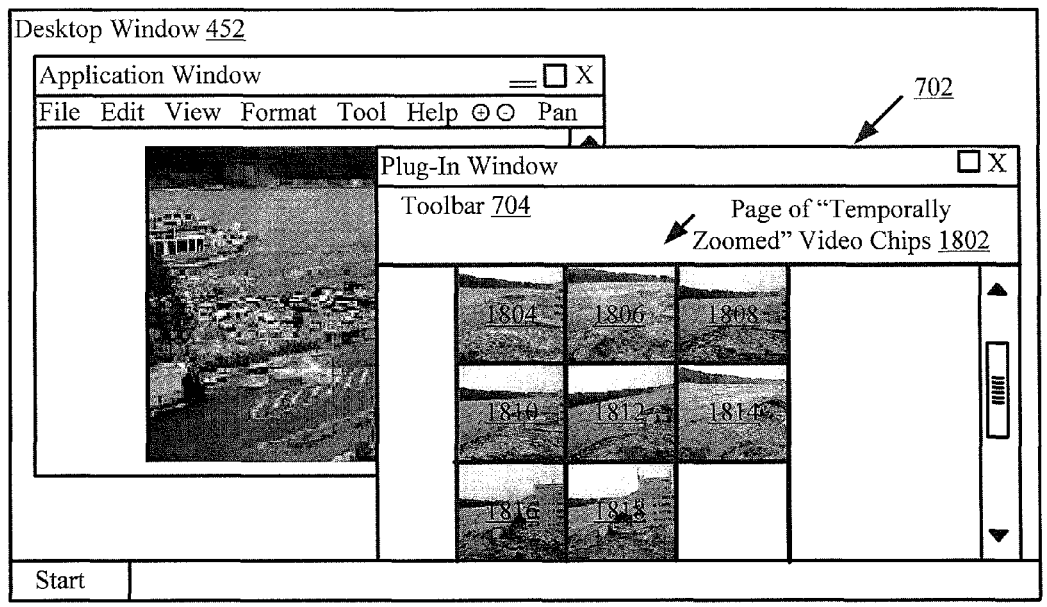
FIG. 18 is a schematic illustration of an exemplary page of "temporally zoomed" video chips that is useful for understanding the present invention.

A schematic illustration of an exemplary page of "temporally zoomed" video chips 1802 is provided in FIG. 18. As shown in FIG. 18, the selected video chip 1704 of FIG. 17 has been broken into a plurality of sub-segments 1804-1818. The sub-segments 1804-1818 have the same temporal level of resolution (or duration) which is less than that of the selected video chip 1704.

Referring again to FIG. 3E, the method 300 continues with step 360. In step 360, the computing device receives a user input for viewing images of all of the currently video chips at a user-specified spatial zoom level of scale. The user input is facilitated by a GUI widget (e.g., GUI widget 826 of FIG. 8A) of the plug-in window (e.g., plug-in window 702 of FIG. 7). The GUI widget is configured to facilitate the performance of manual-spatial scale operations by the feature analysis plug-in. The manual-spatial scale operations are operative to adjust the spatial zoom level of scale of images of all of the displayed video chips from a first spatial zoom level of scale to a second spatial zoom level of scale in response to a user-software interaction. The first spatial zoom level of scale is a default spatial zoom level of scale (e.g., 100%) or a previously user-selected spatial zoom level of scale (e.g., 50%). The second spatial zoom level of scale is a new user-selected spatial zoom level of scale (e.g., 75%). As such, the GUI widget may include, but is not limited to, a drop down list populated with a plurality of whole number percentage values.

After the reception of the user input in step 360, the feature analysis plug-in performs operations for automatically and concurrently generating a plurality of "fixed spatially zoomed" video chips at the user-specified spatial zoom level of scale, as shown by step 361. In a next step 362, the feature analysis plug-in performs operations to create a page of "fixed spatially zoomed" video chips. Thereafter in step 363, the page of "fixed spatially zoomed" video chips is displayed in the plug-in window. In a next step 364 of FIG. 3F, the "fixed spatially zoomed" video chips are simultaneously or concurrently played.

Figure 19:
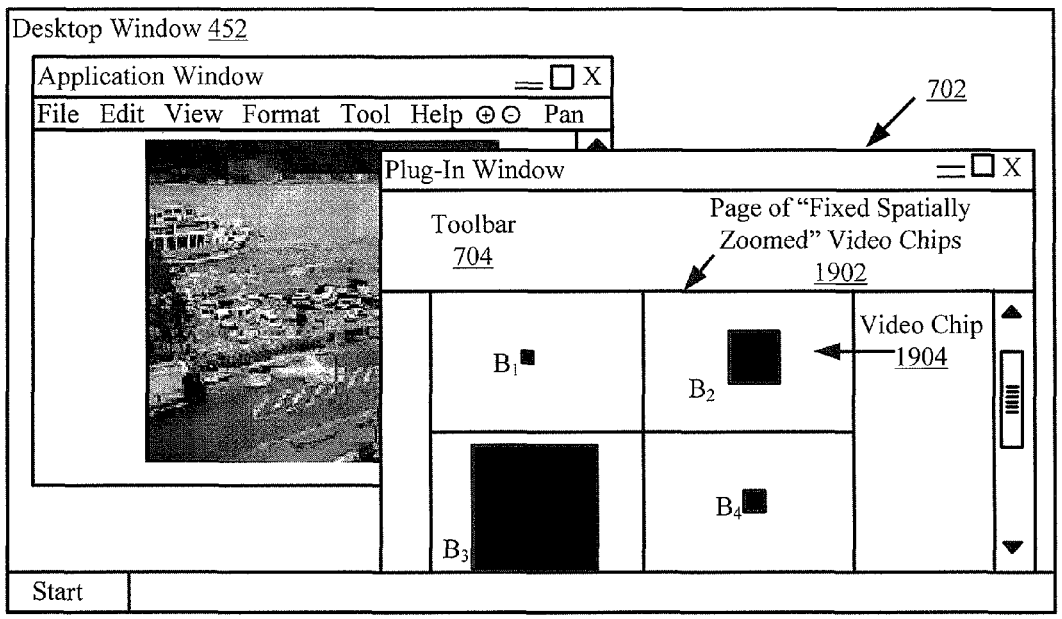
FIG. 19 is a schematic illustration of an exemplary page of "fixed spatially zoomed" video chips that is useful for understanding the present invention.

A schematic illustration of an exemplary page of "fixed spatially zoomed" video chip 1902 is provided in FIG. 19. As shown in FIG. 19, all of the video chips 1904 have the same spatial zoom level of scale. As such, the smallest feature $B_1$ appears smaller than the larger features $B_2$, $B_3$, $B_4$. Similarly, the largest feature $B_3$ appears larger than the smaller features $B_1$, $B_2$, $B_4$. Embodiments of the present invention are not limited to the particularities of FIG. 19.

Referring again to FIG. 3F, the method 300 continues with step 365. In step 365, the computing device receives a user input for viewing all of the currently displayed features (e.g., $B_1$, $B_2$, $B_3$, $B_4$ of FIG. 19) at a best-fit spatial zoom level of scale. The user input is facilitated by a GUI widget (e.g., GUI widget 828 of FIG. 8A) of the plug-in window (e.g., plug-in window 702 of FIG. 7). The GUI widget is configured to facilitate the viewing of each displayed feature at its best-fit spatial zoom level of scale or its pre-defined maximum spatial zoom level of scale. As such, the GUI widget may include, but is not limited to, a button for at least enabling auto-scale operations of the feature analysis plug-in and disabling the manual-spatial scale operations of the feature analysis plug-in.

In response to the reception of the user input in step 365, the feature analysis plug-in performs operations to automatically and concurrently generate a plurality of "auto spatially zoomed" video chips comprising the currently displayed features at the best-fit spatial zoom level of scale, as shown by step 366. In a next step 367, the feature analysis plug-in performs operations to create a page of "auto spatially zoomed" video chips. Thereafter in step 368, the page of "auto spatially zoomed" video chips is displayed in the plug-in window. The "auto spatially zoomed" video chips are then simultaneously or concurrently played, as shown by step 369.

Figure 20:
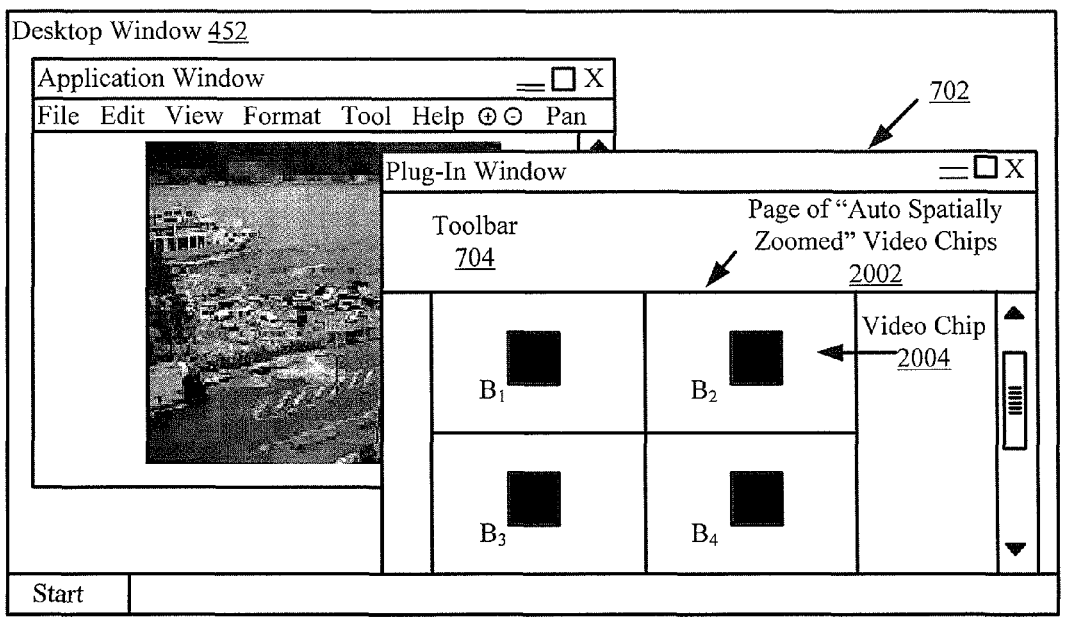
FIG. 20 is a schematic illustration of an exemplary page of "auto spatially zoomed" video chips that is useful for understanding the present invention.
Figure 21:
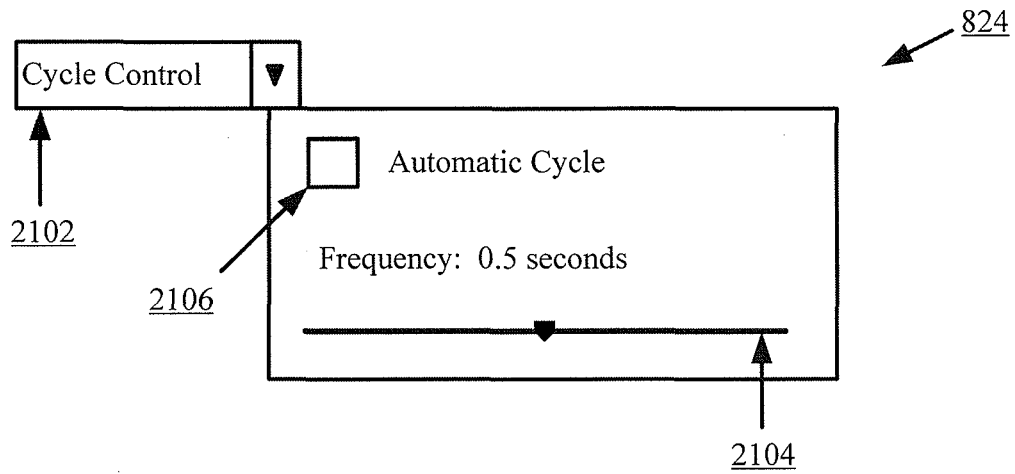
FIG. 21 is a schematic illustration of an exemplary Graphical User Interface ("GUI") widget of a plug-in window that is useful for understanding the present invention.

A schematic illustration of an exemplary page of "auto spatially zoomed" video chips 2002 is provided in FIG. 20. As shown in FIG. 20, each of the video chips 2004 has a different spatial zoom level of scale. As such, all of the features $B_1$, $B_2$, $B_3$, $B_4$ appear to be of the same size regardless of their actual relative physical sizes. Embodiments of the present invention are not limited to the particularities of FIG. 20.

Referring again to FIG. 3F, the method 300 continues with step 370 where the first page of first video chips is re-displayed in the plug-in window. In a next step 372, the computing device receives a user input for cycling through video chip pages for a plurality of video streams. The user input is facilitated by a GUI widget (e.g., GUI widget 824 of FIG. 8A) of the plug-in window. The GUI widget is configured to allow manual cycling and/or automatic cycling between video chip pages for a plurality of video streams. As such, the GUI widget may include, but is not limited to, a check box for enabling and disabling automatic video stream cycling operations of the feature analysis plug-in (e.g., check box 2106 of FIG. 21), a slider for setting the rate at which the video streams automatically cycle (e.g., slider 2104 of FIG. 21), and/or a button for manually commanding when to change the video stream (e.g., button 2102 of FIG. 21).

Figure 22:
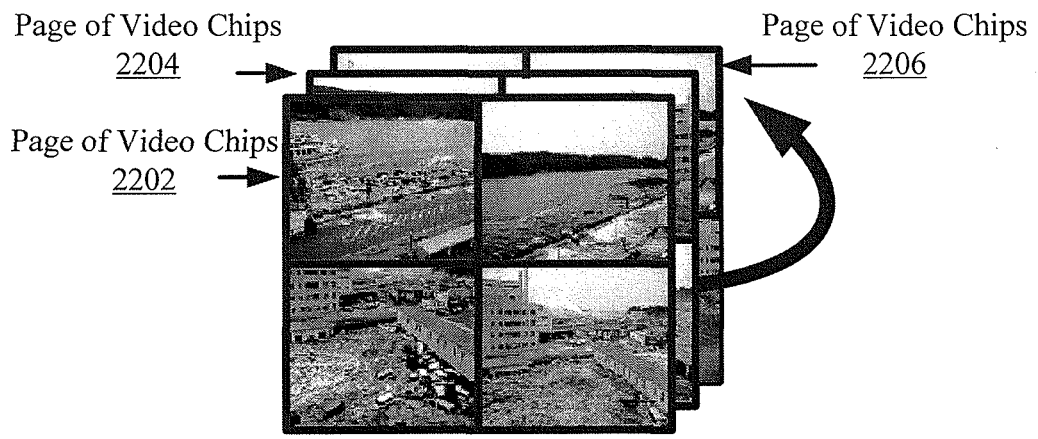
FIG. 22 is a schematic illustration of an exemplary video cycling process that is useful for understanding the present invention.

In response to the reception of the user input in step 372, the feature analysis plug-in performs operations for cycling through the pages of one or more video streams, as shown by step 374. A schematic illustration of an exemplary video stream cycling process performed in step 374 is provided in FIG. 22. As shown in FIG. 22, a first iteration of the video stream cycling process begins with the display of a first page of video chips 2202 generated using a first video stream. Upon the expiration of a pre-defined amount of time or in response to a first user input, a second page of video chips 2204 is displayed in the plug-in window. The second page of video chips was generated using a second video stream different from the first video stream. The first iteration of the video stream cycling process ends with the display of a third page of video chips 2206 in response to a second user input or upon the expiration of the pre-defined amount of time. The third page of video chips 2206 was generated using a third video stream that is different than the first video stream and/or the second video stream. Thereafter, a second iteration of the video stream cycling process can begin such that the pages of video chips 2202, 2204, 2206 are cycled through again. Embodiments of the present invention are not limited to the particularities of FIG. 22.

Referring again to FIG. 3F, the method 300 continues with step 375. In step 375, the computing device receives a user input for "checking" or "flagging" a video chip of the displayed page of first video chips. A user may desire to mark a video chip which contains an occurrence of information contained in a video stream that is relevant to a particular application. The application can include, but is not limited to, a situational awareness application, a natural disaster application, an unmanned vehicle application, a forensic application, a law enforcement application, a medication application, and a military application. Step 375 can involve selecting a video chip. The video chip can be selected by moving a mouse cursor over the video chip and clicking a mouse button. In response to the click of the mouse button, a menu is presented to the user of the computing device. The menu includes a list of commands, such as a command for enabling "check/uncheck" operations of the feature analysis plug-in.

Figure 23:
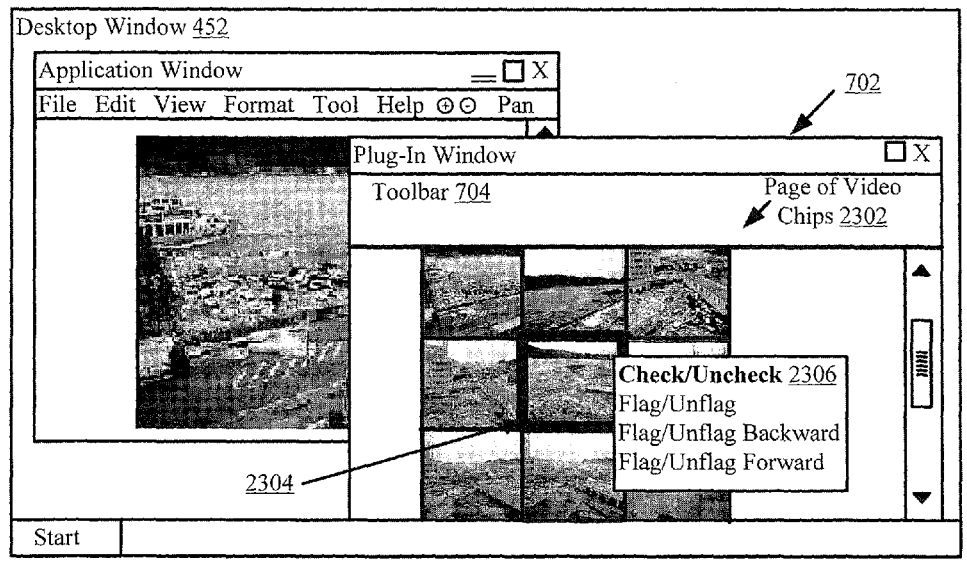
FIG. 23 is a schematic illustration of an exemplary selected video chip and menu of commands that is useful for understanding the present invention.
Figure 24:
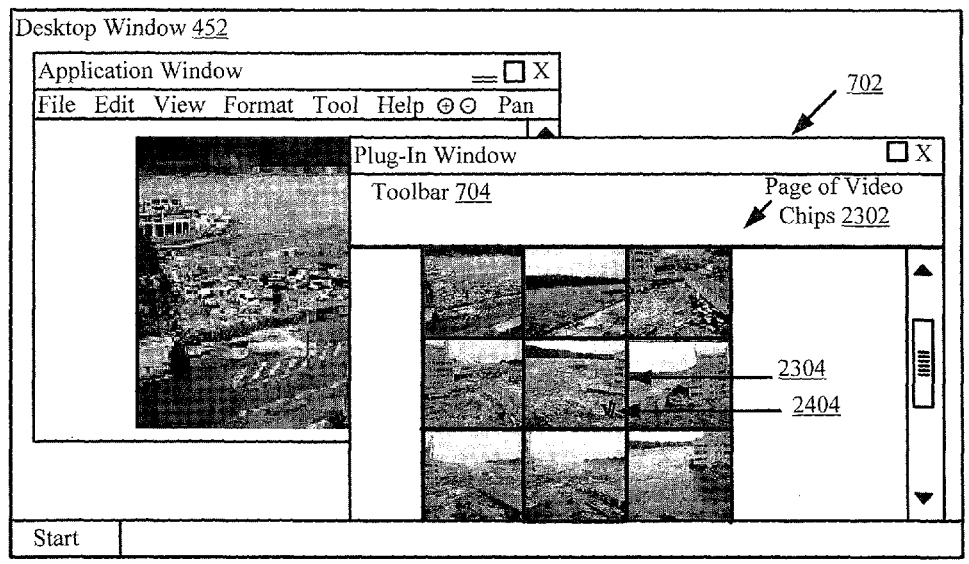
FIG. 24 is a schematic illustration of an exemplary "checked" video chip that is useful for understanding the present invention.
Figure 25:
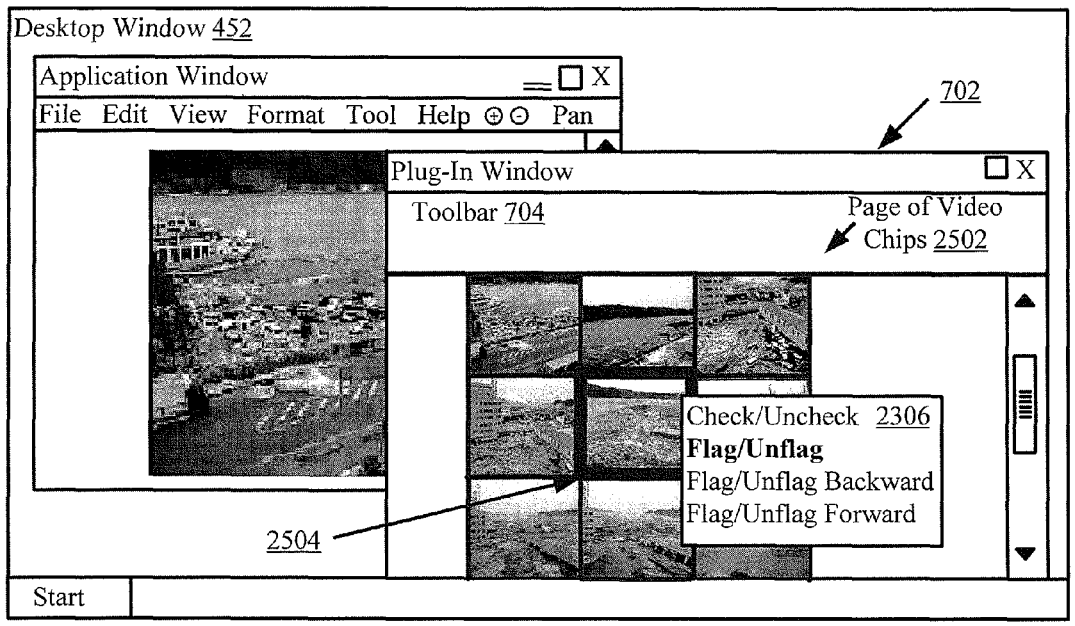
FIG. 25 is a schematic illustration of an exemplary selected video chip and menu of commands that is useful for understanding the present invention.
Figure 26:
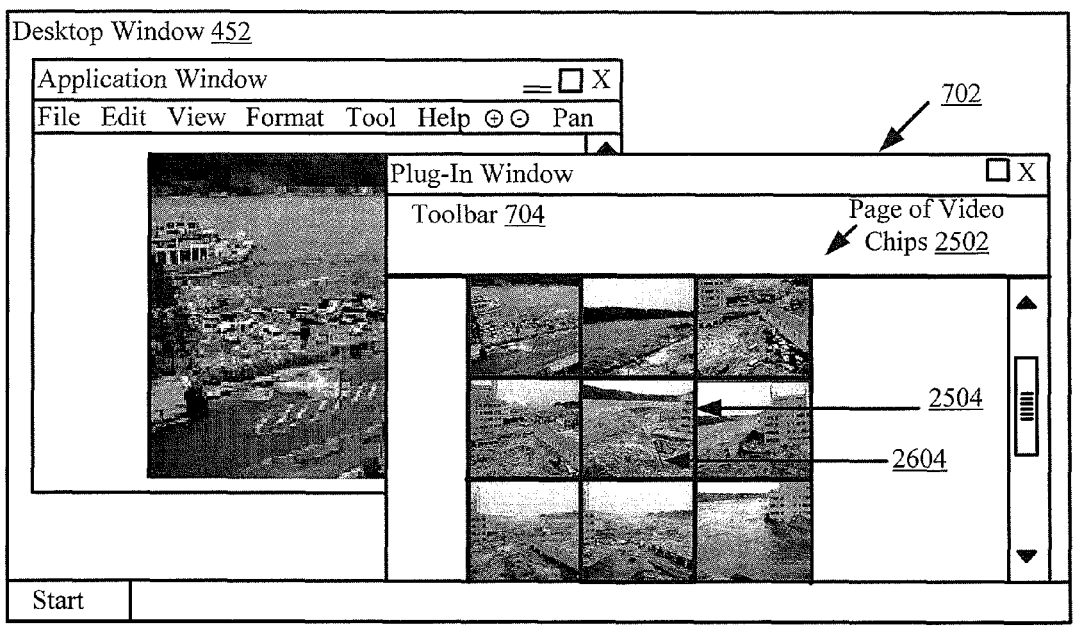
FIG. 26 is a schematic illustration of an exemplary "flagged" video chip that is useful for understanding the present invention.

Schematic illustrations of exemplary selected video chips 2304, 2504 and exemplary menus 2306 are provided in FIGS. 23 and 25. As shown in FIGS. 23 and 25, the selected video chip 2304, 2504 is annotated with a relatively thick and distinctly colored border. Also, a selected command "Check/Uncheck" or "Flag/Unflag" of the menu 2306 is annotated by bolding the text thereof. Embodiments of the present invention are not limited in this regard. Any type of mark or annotation can be used to illustrate that a particular chip image has been selected and/or that a particular command of a menu has been selected.

Figure 3F:
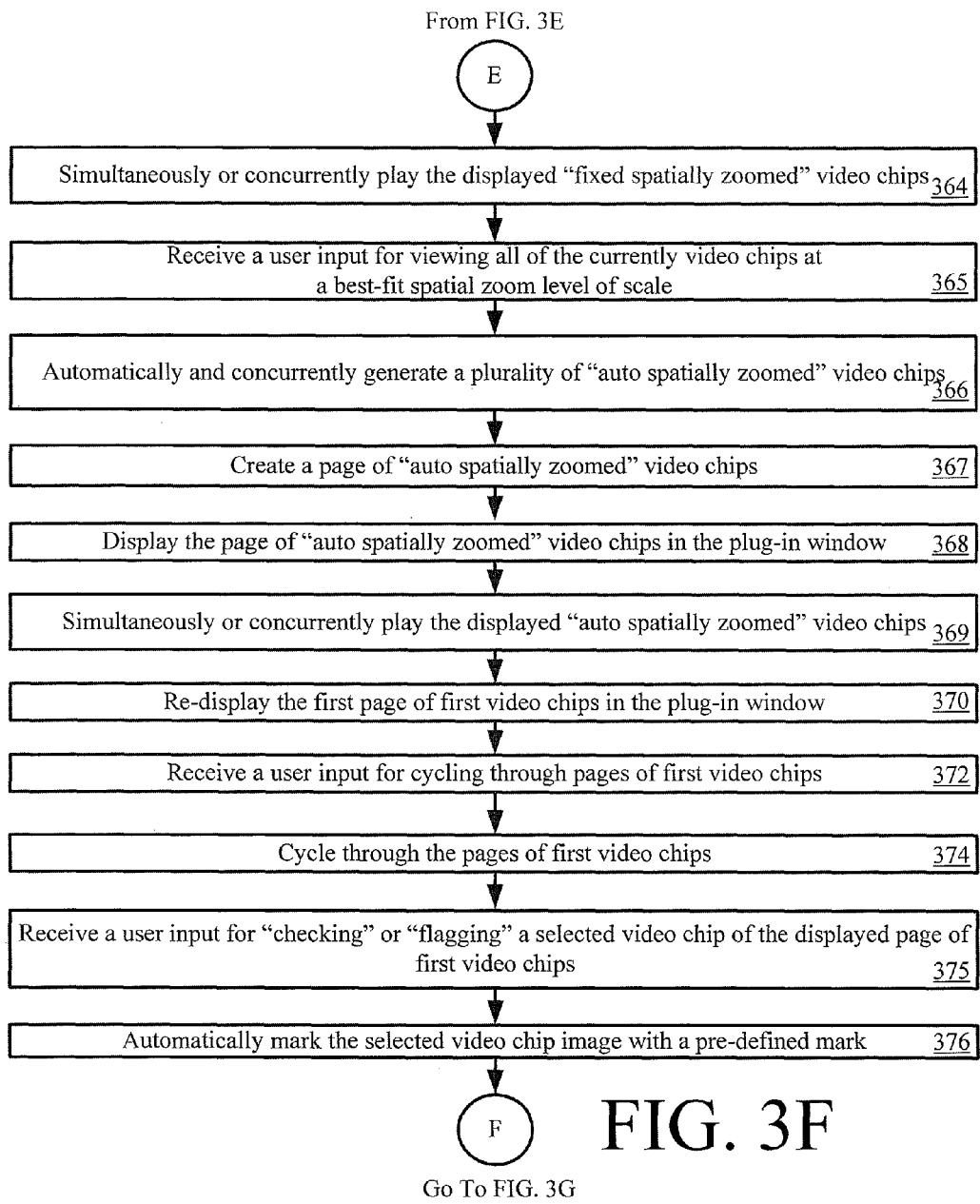

In response to the reception of the user input in step 375 of FIG. 3F, the feature analysis plug-in performs step 376. In step 376, the selected video chip is automatically marked with a pre-defined mark. A schematic illustration of a video chip 2304 marked with a check 2404 is provided in FIG. 24. A schematic illustration of a video chip 2504 marked with a flag 2604 is provided in FIG. 26. Embodiments of the present invention are not limited to the particularities of FIGS. 24 and 26. Any type of mark or annotation can be employed to illustrate that a chip image has been checked or flagged.

Figure 3G:
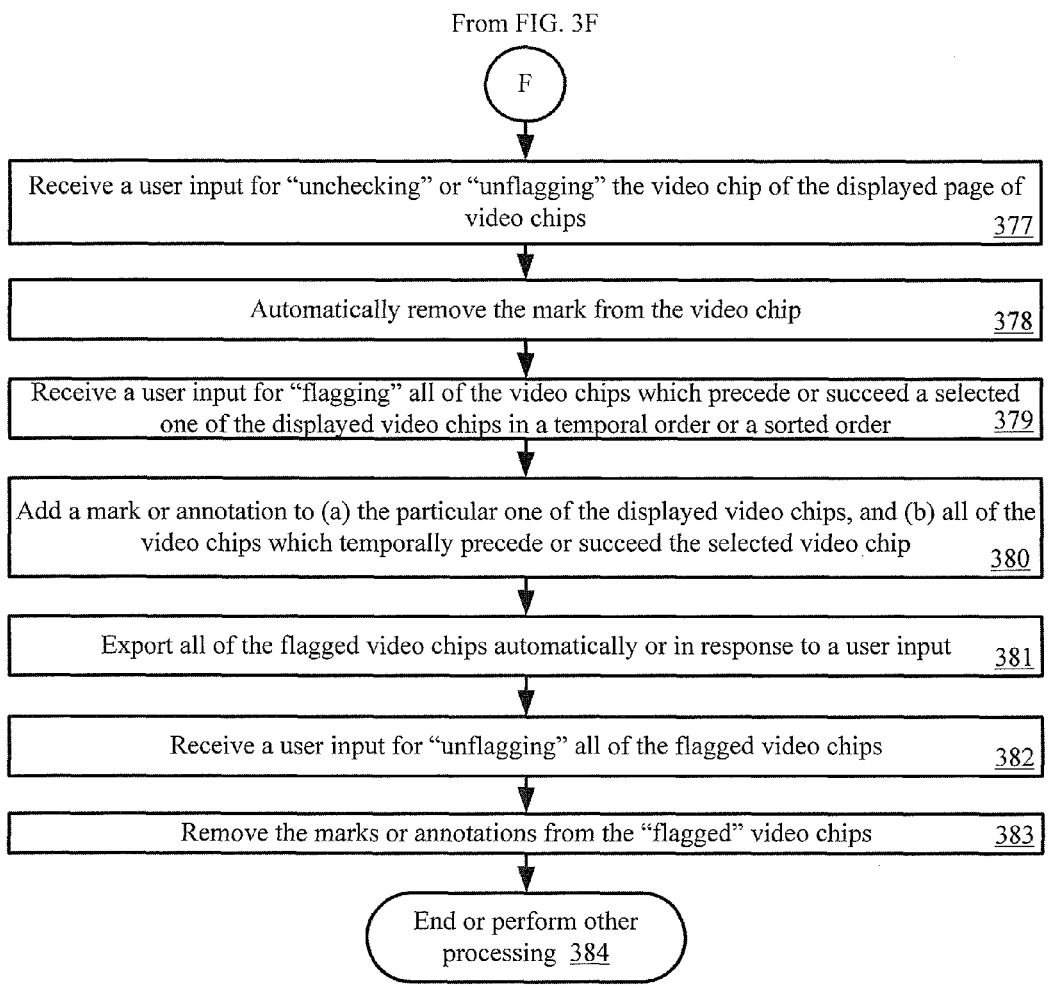

After completion of step 376, the method 300 continues with step 377 of FIG. 3G. Referring now to FIG. 3G, step 377 involves receiving, by the computing device, a user input for "unchecking" or "unflagging" the marked video chip (e.g., video chip 2304 of FIG. 24 or video chip 2504 of FIG. 26) of the displayed page of video chips. In response to the user input of step 377, the mark (e.g., mark 2404 of FIG. 24 or mark 2604 of FIG. 26) is automatically removed from the marked video chip (e.g., video chip 2304 of FIG. 24 or video chip 2504 of FIG. 26), as shown by step 378.

In a next step 379, the computing device receives a user input for "flagging" all of the video chips which precede or succeed a selected one of the displayed video chips in a temporal order or a sorted order. The video chip is selected by moving a mouse cursor over the video chip and clicking a mouse button. In response to the click of the mouse button, a menu is presented to the user of the computing device. The menu includes a list of commands, such as a command for enabling "Flag/Unflag Backward" or "Flag/Unflag Forward" operations.

Figure 27:
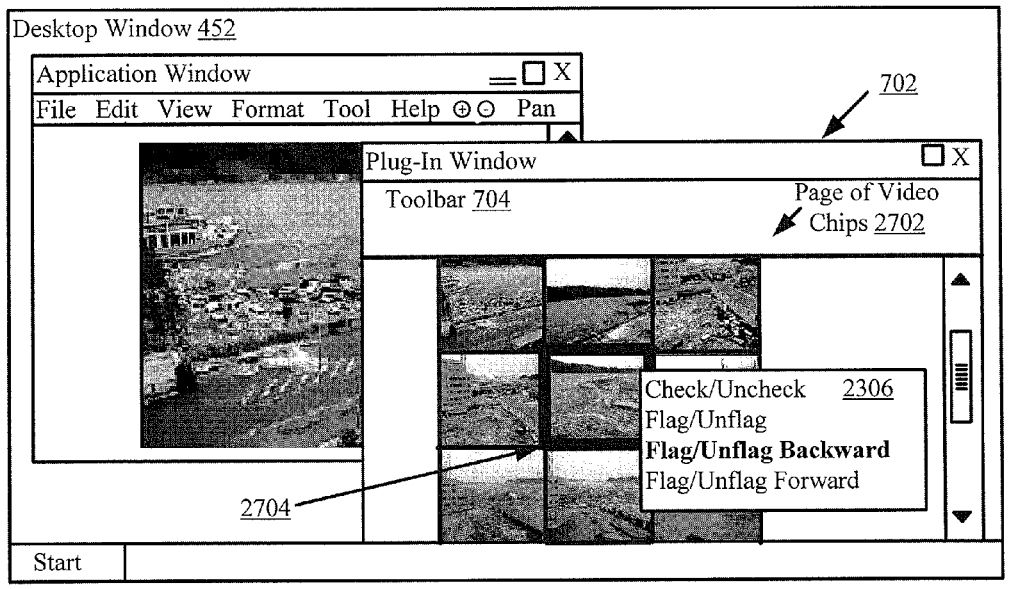
FIG. 27 is a schematic illustration of an exemplary selected video chip and menu of commands that is useful for understanding the present invention.
Figure 28:
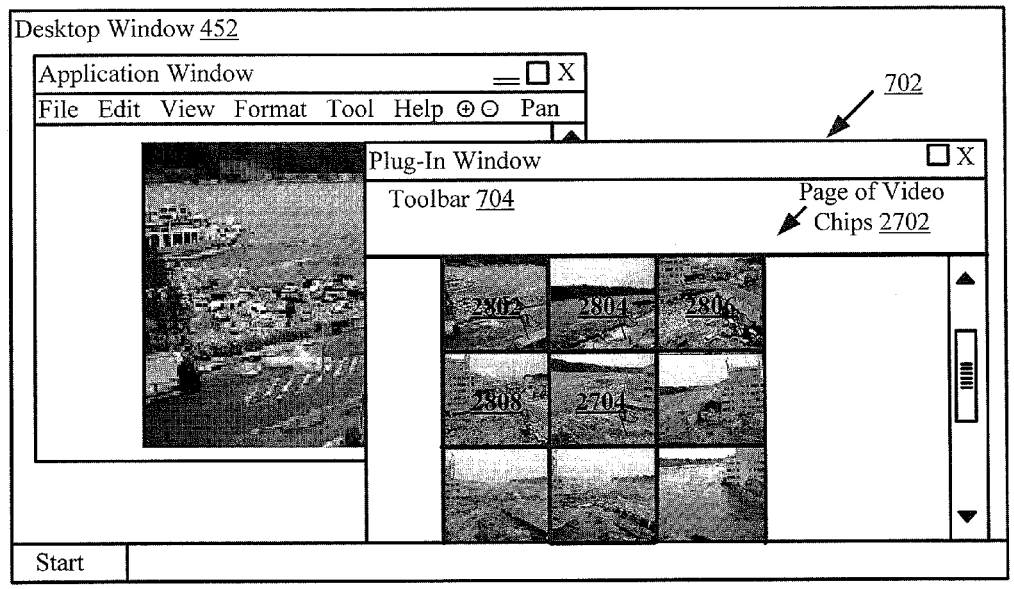
FIG. 28 is a schematic illustration of a plurality of "flagged backward" video chips that is useful for understanding the present invention.
Figure 29:
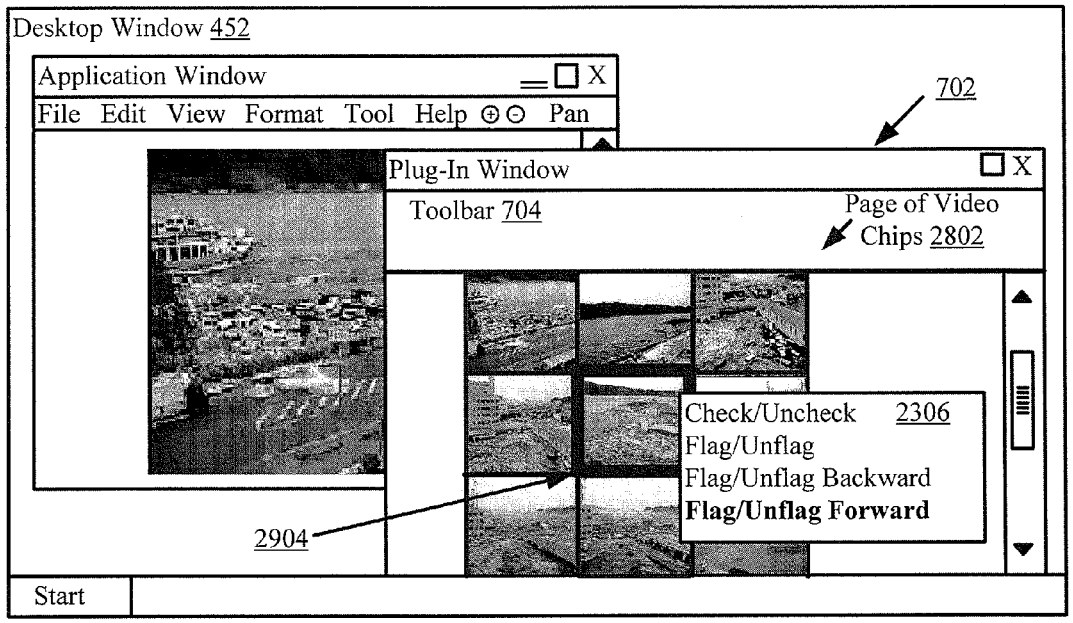
FIG. 29 is a schematic illustration of an exemplary selected video chip and menu of commands that is useful for understanding the present invention.
Figure 30:
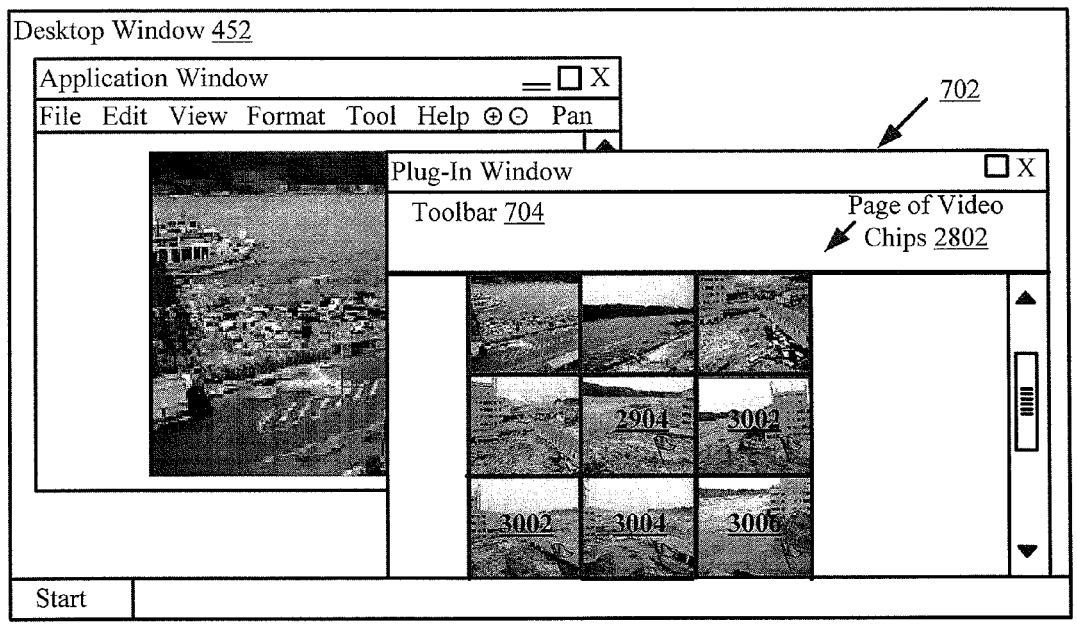
FIG. 30 is a schematic illustration of a plurality of "flagged forward" video chips that is useful for understanding the present invention.

Schematic illustrations of exemplary selected video chips 2704, 2904 and exemplary menus 2306 are provided in FIGS. 27 and 29. As shown in FIGS. 27 and 29, the selected video chip 2704, 2904 is annotated with a relatively thick and distinctly colored border. Also, the selected command "Flag/Unflag Backward" or "Flag/Unflag Forward" of the menu 2306 is annotated by bolding the text thereof. Embodiments of the present invention are not limited in this regard. Any type of mark or annotation can be used to illustrate that a particular chip image has been selected and/or that a particular command of a menu has been selected.

Referring again to FIG. 3G, the method 300 continues with step 380. In step 380, the feature analysis plug-in performs operations to add a mark or annotation to the selected video chip (e.g., video chip 2704 of FIG. 27 or video chip 2904 of FIG. 29) and to all of the video chips which precede or succeed the selected video chip in a temporal order or a sorted order (e.g., video chips 2802-2808 of FIG. 28 and chip images 3002-3006 of FIG. 30). Upon completing step 380, step 381 is performed where all of the "flagged" chip images are exported to a table or file. The exportation can be initiated by a user of the computing device using a GUI widget (e.g., GUI widget 816 or 818 of FIG. 8A) of the plug-in window.

In a next step 382, the computing device receives a user input for unflagging all of the "flagged" video chips. In response to the user input of step 382, step 383 is performed where the marks or annotations are removed from the "flagged" video chips. Subsequently, step 384 is performed where the method ends or other processing is performed.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for efficient video analysis, comprising:
displaying, by said computing device, a first video stream in a first Graphical User Interface ("GUI") window facilitating use of first functions of a first software application;
automatically identifying, by a computing device, visual representations of at least one object which are contained in said first video stream;
generating, by said computing device, a plurality of first video chips using first video data defining said first video stream, each of said first video chips comprising a segment of said first video stream which comprises at least one of said visual representations which have been identified;
displaying, by said computing device, a first array comprising a plurality of first cells in which said first video chips are presented within a second GUI window facilitating use of second functions of a second software application, which is concurrently displayed with the first GUI window as a separate and distinct GUI window;
concurrently playing said first video chips within the second GUI window, where said first video chips each have a first temporal resolution specifying a numerical value representing a total duration of a video stream;
receiving a user-software interaction for changing said first temporal resolution of at least one selected video chip from the first video chips concurrently displayed in the second GUI window;
generating, by said computing device, a plurality of second video chips having a second temporal resolution lower than said first temporal resolution in response to said user-software interaction;
displaying, by said computing device, a second array comprising a plurality of second cells in which said plurality of second video chips can be presented within said second GUI window; and
concurrently playing said plurality of second video chips which are presented within said plurality of second cells.

2. The method according to claim 1, further comprising:
generating, by said computing device, a plurality of aggregated video chips, each comprising a segment of said first video stream including at least two chips of said plurality of first video chips, wherein said at least two chips are presented in a temporal order.

3. The method according to claim 2, further comprising:
presenting, by said computing device, a third array comprising a plurality of third cells in which said plurality of aggregated video chips can be presented within said second GUI window;
respectively presenting said plurality of aggregated video chips within said plurality of third cells; and
concurrently playing said plurality of aggregated video chips which are presented within said plurality of third cells.

4. The method according to claim 1, wherein said first array comprises a grid having a pre-defined grid size.

5. The method according to claim 4, further comprising changing, by the computing device, the grid size in response to a user input selecting a new grid size from a plurality of grid sizes.

6. The method according to claim 4, further comprising:
generating, by said computing device, a plurality of pages of video chips for said first video stream when a selected feature class has more than a maximum number of features that can fit in said grid of said pre-defined grid size;
wherein each of said plurality of pages of video chips comprises video chips that are different than said video chips of all other pages of said plurality of pages of video chips.

7. The method according to claim 6, further comprising paging forward or backward, by said computing device, through said plurality of pages of video chips in response to a user-software interaction.

8. The method according to claim 6, further comprising changing, by said computing device, visual content of said second GUI window from a first page of said plurality of pages of video chips to a second page of said plurality of pages of video chips.

9. The method according to claim 1, further comprising displaying in said GUI window information relating to an attribute of a feature contained in a selected one of said plurality of first video chips.

10. The method according to claim 1, further comprising:
sorting, by said computing device, said plurality of first video chips in an ascending or descending order based on at least one feature attribute; and
displaying, by said computing device, said plurality of first video chips in said ascending or descending order.

11. The method according to claim 1, further comprising:
filtering, by said computing device, said plurality of first video chips based on at least one feature attribute; and
displaying, by said computing device, said plurality of first video chips which have been filtered in said second GUI window.

12. The method according to claim 1, further comprising:
changing, by said computing device, a spatial zoom level of scale of images of said plurality of first video chips from a first zoom level of scale to a second zoom level of scale in response to a user-software interaction; and
wherein said second spatial zoom level of scale is a user-specified spatial zoom level of scale, a pre-defined fixed spatial zoom level of scale, or a best-fit spatial zoom level of scale.

13. The method according to claim 1, further comprising cycling, by said computing device, through a plurality of pages of video chips that were generated using said first video data of said first video stream and second video data of a second video stream.

14. The method according to claim 1, further comprising adding, by said computing device, a mark or annotation to at least one of said plurality of first video chips in response to a user-software interaction.

15. The method according to claim 1, further comprising adding, by said computing device, a mark or annotation to all of said plurality of first video chips that precede or succeed a selected one of said plurality of video chips in a temporal order or a sorted order.

16. The method according to claim 1, further comprising exporting, by said computing device, at least one of a plurality of video chips that precede or succeed a selected one of said plurality of first video chips in a temporal order or a sorted order.

17. The method according to claim 1, further comprising storing, by said computing device, various settings that a user sets for at least one of a plurality of feature classes during at least one session.

18. A system comprising:
at least one electronic circuit configured to:
display a first video stream in a first Graphical User Interface ("GUI") window facilitating use of first functions of a first software application;
automatically identify visual representations of at least one object which are contained in said first video stream;
generate a plurality of first video chips using first video data defining said first video stream, each of said first video chips comprising a segment of said first video stream which comprises at least one of said visual representations which have been identified;
display a first array comprising a plurality of first cells in which said first video chips are presented within a second GUI window facilitating use of second functions of a second software application, which is concurrently displayed with the first GUI window as a separate and distinct GUI window;
concurrently play said first video chips within the second GUI window, where said first video chips each have a temporal resolution specifying a numerical value representing a total duration of a video stream;
receive a user software interaction for changing said first temporal resolution of at least one selected video chip from the first video chips concurrently displayed in the second GUI window;
generating a plurality of second video chips having a second temporal resolution lower than said first temporal resolution in response to said user-software interaction;
displaying a second array comprising a plurality of second cells in which said plurality of second video chips can be presented within said second GUI window; and
concurrently playing said plurality of second video chips which are presented within said plurality of second cells.

19. The system according to claim 18, wherein said electronic circuit is further configured to:
generate a plurality of aggregated video chips, each comprising a segment of said first video stream including at least two chips of said plurality of first video chips; and
presenting said at least two chips in a temporal order.

20. The system according to claim 19, wherein said electronic circuit is further configured to:
present a third array comprising a plurality of third cells in which said plurality of aggregated video chips can be presented within said second GUI window;
respectively present said plurality of aggregated video chips within said plurality of third cells; and
concurrently play said plurality of aggregated video chips which are presented within said plurality of third cells.

21. The system according to claim 18, wherein said first array comprises a grid having a pre-defined grid size.

22. The system according to claim 21, wherein said electronic circuit is further configured to change the grid size in response to a user input selecting a new grid size from a plurality of grid sizes.

23. The system according to claim 21, wherein said electronic circuit is further configured to:
generate a plurality of pages of video chips for said first video stream when a selected feature class has more than a maximum number of features that can fit in said grid of said pre-defined grid size;
wherein each of said plurality of pages of video chips comprises video chips that are different than said video chips of all other pages of said plurality of pages of video chips.

24. The system according to claim 23, wherein said electronic circuit is further configured to page forward or backward through said plurality of pages of video chips in response to a user-software interaction.

25. The system according to claim 23, wherein said electronic circuit is further configured to change visual content of said second GUI window from a first page of said plurality of pages of video chips to a second page of said plurality of pages of video chips.

26. The system according to claim 18, wherein said electronic circuit is further configured to display in said second GUI window information relating to an attribute of a feature contained in a selected one of said plurality of first video chips.

27. The system according to claim 18, wherein said electronic circuit is further configured to:
   sort said plurality of first video chips in an ascending or descending order based on at least one feature attribute; and
   display said plurality of first video chips in said ascending or descending order.

28. The system according to claim 18, wherein said electronic circuit is further configured to:
   filter said plurality of first video chips based on at least one feature attribute; and
   display said plurality of first video chips which have been filtered in said second GUI window.

29. The system according to claim 18, wherein said electronic circuit is further configured to:
   change a spatial zoom level of scale of images of said plurality of first video chips from a first zoom level of scale to a second zoom level of scale in response to a user-software interaction; and
   wherein said second spatial zoom level of scale is a user-specified spatial zoom level of scale, a pre-defined fixed spatial zoom level of scale, or a best-fit spatial zoom level of scale.

30. The system according to claim 18, wherein said electronic circuit is further configured to cycle through a plurality of pages of video chips that were generated using said first video data of said first video stream and second video data of a second video stream.

31. The system according to claim 18, wherein said electronic circuit is further configured to add a mark or annotation to at least one of said plurality of first video chips in response to a user-software interaction.

32. The system according to claim 18, wherein said electronic circuit is further configured to add a mark or annotation to all of said plurality of first video chips that precede or succeed a selected one of said plurality of video chips in a temporal order or a sorted order.

33. The system according to claim 18, wherein said electronic circuit is further configured to export at least one of said plurality of video chips that precede or succeed a selected one of said plurality of first video chips in a temporal order or a sorted order.

34. The system according to claim 18, wherein said electronic circuit is further configured to store various settings that a user sets for at least one of a plurality of feature classes during at least one session.

* * * * *